US012739773B2

(12) United States Patent
Ninglekhu et al.

(10) Patent No.: US 12,739,773 B2
(45) Date of Patent: Sep. 15, 2026

(54) APPLICATION INTERACTION FOR NETWORK SLICING

(71) Applicant: InterDigital Patent Holdings, Inc., Wilmington, DE (US)

(72) Inventors: Jiwan Ninglekhu, Royersford, PA (US); Michael Starsinic, Newtown, PA (US); Quang Ly, North Wales, PA (US); Catalina Mladin, Hatboro, PA (US)

(73) Assignee: InterDigital Patent Holdings, Inc, Wilmington, DE (US)

( * ) Notice: Subject to any disclaimer, the term of this patent is extended or adjusted under 35 U.S.C. 154(b) by 0 days.

(21) Appl. No.: 18/689,233

(22) PCT Filed: Sep. 15, 2022

(86) PCT No.: PCT/US2022/076468

§ 371 (c)(1),
(2) Date: Mar. 5, 2024

(87) PCT Pub. No.: WO2023/044371

PCT Pub. Date: Mar. 23, 2023

(65) Prior Publication Data

US 2024/0373388 A1 Nov. 7, 2024

Related U.S. Application Data

(60) Provisional application No. 63/245,656, filed on Sep. 17, 2021.

(51) Int. Cl.
*H04W 60/04* (2009.01)
*H04W 48/02* (2009.01)
(Continued)

(52) U.S. Cl.
CPC ........... *H04W 60/04* (2013.01); *H04W 48/02* (2013.01); *H04W 48/06* (2013.01); *H04W 48/18* (2013.01); *H04W 76/30* (2018.02)

(58) Field of Classification Search
CPC ..... H04W 60/04; H04W 76/30; H04W 76/10; H04W 48/02; H04W 48/18; H04W 24/02;
(Continued)

(56) References Cited

U.S. PATENT DOCUMENTS 11,425,634 B2 * 8/2022 Zhu ...................... H04W 76/11
11,792,634 B2 * 10/2023 Gundavelli ............. H04W 8/12 455/433

(Continued)

FOREIGN PATENT DOCUMENTS

EP 3496447 A1 6/2019
EP 3849103 A1 7/2021

(Continued)

OTHER PUBLICATIONS

3rd Generation Partnership Project, "Technical Specification Group Core Network and Terminals; Non-Access-Stratum (NAS) protocol for 5G System (5GS); Stage 3; (Release 16)", vol. CT WG1, No. V16.4.1, Apr. 1, 2020 (Apr. 1, 2020), p. 1-666.

(Continued)

*Primary Examiner* — Matthew C Sams
(74) *Attorney, Agent, or Firm* — Flaster Greenberg P.C.

(57) ABSTRACT

Methods, apparatus, and systems are described for improved application interaction for network slicing. A wireless transmit/receive unit may send, to a network node, a registration request including an indication that the WTRU is capable of receiving information associated with a temporal availability of a network slice. The WTRU may receive a registration response including the information associated with the temporal availability of the network slice. The WTRU may
(Continued)

determine, based on the temporal availability of the network slice, to stop use of a protocol data unit (PDU) session associated with the network slice.

16 Claims, 18 Drawing Sheets

(51) Int. Cl.
*H04W 48/06* (2009.01)
*H04W 48/18* (2009.01)
*H04W 76/30* (2018.01)

(58) Field of Classification Search
CPC ... H04W 48/16; H04W 40/248; H04W 76/38; H04W 28/16; H04W 8/12; H04W 12/06; H04W 12/08; H04W 12/082; H04W 36/0058; H04W 36/0079; H04W 36/06; H04W 36/12; H04W 36/13; H04W 36/326; H04W 40/24; H04W 48/04; H04W 48/12; H04W 48/20; H04W 60/00; H04W 60/06; H04W 64/00; H04W 64/003; H04W 74/006; H04W 74/0833; H04W 76/11; H04W 8/06; H04W 88/18
See application file for complete search history.

(56) References Cited

U.S. PATENT DOCUMENTS 11,864,026 B2 1/2024 Patil et al.
12,041,538 B2 * 7/2024 Olvera-Hernandez ...................... H04W 24/02
12,127,061 B2 * 10/2024 Panchal ................ H04W 76/30
12,495,381 B2 * 12/2025 Chun .................... H04W 60/00
2018/0124660 A1 5/2018 Zhang et al.
2018/0324577 A1 * 11/2018 Faccin .................. H04W 76/27
2019/0364495 A1 11/2019 Mildh et al.
2020/0229069 A1 * 7/2020 Chun .................... H04W 76/30
2020/0260330 A1 * 8/2020 Zhu ....................... H04W 28/16
2020/0267554 A1 * 8/2020 Faccin .................. H04W 12/06
2021/0037426 A1 2/2021 Zhu et al.
2021/0168705 A1 6/2021 Fiorese et al.
2021/0235526 A1 7/2021 Kozlowski et al.
2021/0250854 A1 * 8/2021 Olvera-Hernandez ...................... H04W 28/16
2022/0159605 A1 * 5/2022 Li ........................... H04L 67/34
2022/0377656 A1 11/2022 Kuge
2023/0136296 A1 * 5/2023 Chun .................... H04W 88/18 370/331
2023/0180082 A1 * 6/2023 Panchal ................ H04W 36/08 370/331
2023/0247685 A1 * 8/2023 Choe ..................... H04W 76/10 370/329
2024/0032105 A1 * 1/2024 Xu .................... H04W 74/0833
2024/0314857 A1 * 9/2024 Lu ......................... H04W 76/12
2024/0365220 A1 * 10/2024 Bulakci ................. H04W 48/18
2025/0016644 A1 * 1/2025 Panchal ................ H04W 76/12

FOREIGN PATENT DOCUMENTS

WO WO 2017/143047 A1 8/2017
WO WO 2020/186145 A1 9/2020
WO 2020226345 A1 11/2020
WO WO-2021132288 A1 * 7/2021 ............ H04W 48/06
WO WO 2021/183870 A1 9/2021
WO WO 2023/194350 A1 10/2023
WO 2024210592 A1 10/2024

OTHER PUBLICATIONS

3rd Generation Partnership Project, “Introduction of support of NG.116 attribute Simultaneous Use of a Network Slice”, Nokia, et al, S2-2105157, 3GPP TSG-SA2 Meeting # 145E, May 17-28, 2021, 36 pages.
3GPP TS 23.501, System Architecture for the 5G System; Stage 2, V17.1.1, Release 17 (Jun. 2021).
3GPP TS 23.502, Procedures for the 5G System; Stage 2, V17.1.0 Release 17, (Jun. 2021).
GSMA NG.116 Generic Slice Template, Version 1.0, May 23, 2019.
3GPP TS 38.101-1 User Equipment (UE) radio transmission and reception; Part 1: Range 1 Standalone, V16.1.0 (Sep. 2019).
3GPP TS 38.101-2 User Equipment (UE) radio transmission and reception; Part 2: Range 2 Standalone, V16.1.0 (Sep. 2019).
3GPP TS 23.503, Policy and Charging Control Framework for the 5G System (5GS); Stage 2 (Release 16).
3GPP TS 23.122 Non-Access-Stratum (NAS) functions related to Mobile Station (MS) in idle mode V16.4.0 (Dec. 2019).
3GPP TS 24.501 Non-Access-Stratum (NAS) protocol for 5G System (5GS); Stage 3 (V16.3.0).
3rd Generation Partnership Project (3GPP), “Introduction of Subscription-Based Restriction to Simultaneous Use of Network Slices”, 3GPP TSG-SA WG2 #145E e-meeting, Elbonia, Huawei, HiSilicon, S2-2104641, May 17-28, 2021, 29 pages.
Qualcomm Incorporated, “Handling of PDU Sessions at Slice Unavailability”, TS 23.501, S2-174050, May 15-19, 2017, 9 pages.
3GPP TR 23.700-40 V17.0.0, “Study on enhancement of network slicing; Phase 2 (Release 17)”, 3GPP TR 23.700-40 V17.0.0 3rd Generation Partnership Project; Technical Specification Group Services and System Aspects;, Mar. 2021, 224 Pages.

* cited by examiner

APPLICATION INTERACTION FOR NETWORK SLICING

CROSS-REFERENCE TO RELATED APPLICATIONS

This application is the 371 National Stage of International Application No. PCT/US2022/076468, filed Sep. 15, 2022, which claims the benefit of U.S. Provisional Patent Application No. 63/245,656, filed Sep. 17, 2021, the contents of which are incorporated by reference herein in their entirety.

BACKGROUND

The 3rd Generation Partnership Project (3GPP) develops technical standards for cellular telecommunications network technologies, including radio access, the core transport network, and service capabilities-including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G."

By utilizing 5G Network Slicing, multiple networks (e.g., virtualized and independent) may be created on top of a common physical infrastructure. Each "slice" or portion of the network may be allocated based on the specific needs of the application, use case or customer. Operators may allocate resources to each slice, utilizing the necessary speed, throughput and latency to cover the breadth of network slicing in 5G. Despite the many technological benefits associated with network slicing, there are still many challenges that remain for operators and developers. For example, current standards do not address per-application authentication and authorization for accessing network slices.

Application interaction for network slicing in 5G networks may encompass a wide variety of scenarios, servers, gateways, and devices, such as those described in, for example: [1] 3GPP TS 23.501, System Architecture for the 5G System; Stage 2, V17.1.1, Release 17 (2021-06); [2] 3GPP TS 23.502, Procedures for the 5G System; Stage 2, V17.1.0 Release 17, (2021-06); [3] GSMA NG.116 Generic Slice Template, Version 1.0, 23 May 2019; [4] 3GPP TS 38.101-1 User Equipment (UE) radio transmission and reception; Part 1: Range 1 Standalone, V16.1.0 (2019-09); [5] 3GPP TS 38.101-2 User Equipment (UE) radio transmission and reception; Part 2: Range 2 Standalone, V16.1.0 (2019-09); [6] 3GPP TS 23.503, Policy and Charging Control Framework for the 5G System (5GS); Stage 2 (Release 16); [7] TS 23.122 Non-Access-Stratum (NAS) functions related to Mobile Station (MS) in idle mode V16.4.0 (2019-12); and [8] 3GPP TS 24.501 Non-Access-Stratum (NAS) protocol for 5G System (5GS); Stage 3 (V 16.3.0).

SUMMARY

Described herein are methods, apparatus, and systems for application interaction for network slicing. For example, a per-application authentication and authorization (PAAA) may be performed for the UE to access network slices and data networks.

5GS may be enhanced such that both core network and UEs may behave efficiently when there are no authorized network slices available in a given location. Enhanced S-NSSAIs with PAAA indicators may be configured in the core network and a mechanism is provided to deliver such S-NSSAIs to the UE. A PDU Session Establishment procedure may be enhanced to conduct a per-application authentication and authorization for a network slice that requires PAAA. A PAAA mechanism may be provided where the UE receives the information for application functions (AFs) where the authenticated/authorized application may send/receive application traffic using the established PDU session. A mechanism may be provided by which an unauthorized second application is restricted from using the PDU session for traffic from a first application, According to some aspects, a mechanism may be provided by which a PDU session established by the first application may be modified and utilized by a second application after the second application's successful per-application authentication and authorization.

According to some aspects, an enhanced URSP with NSSA flags, which upon evaluation indicates to the UE if the S-NSSAI selected using NSSP requires PAAA, may be provided.

According to some aspects, mechanisms are provided by which the core network may be able to utilize consolidated temporal and spatial information to proactively redirect UE to TAs and frequency bands where relevant network slices are authorized to the UE. Mechanisms are provided by which a UE may utilize the consolidated temporal and spatial information such that the UE may change its direction and maintain a suitable speed or decide to follow a path towards the TAs where there is a high probability of finding authorized network slices.

According to some aspects, mechanisms are provided by which the UE may utilize the consolidated temporal and spatial information so that the UE may gracefully save the state (e.g., idle, connected, active, inactive, etc.) of the applications and/or disable them, save the state (e.g., idle, connected, active, inactive, etc.) of the PDU sessions, buffer uplink data and/or take one of more power saving actions like reduced cell search, sleep, etc.

According to some aspects, mechanisms are provided by which the UE Registration procedure, UE Registration Update procedure and/or UE Configuration Update procedures may be enhanced to convey temporal and spatial information to the UE.

According to some aspects, mechanisms are provided by which the UE may utilize a unique identifier for elevated privilege to access network slices wherein network slices are not available to the common UEs.

According to some aspects, a wireless transmit/receive unit (WTRU) may comprise one or more processors and memory storing instructions that, when executed by the one or more processors, cause the WTRU to perform one or more operations.

According to some aspects, the WTRU may send a registration request to a network node. For example, the network node may be an access and mobility management function (AMF). The registration request may comprise an indication that the WTRU is capable of receiving information associated with a temporal availability of a network slice. For example, the information associated with the temporal availability of the network slice may include a time period when the slice is or is not available to the WTRU. According to some aspects, a slice remapping procedure may be performed based on the temporal availability of the network slice.

According to some aspects, the WTRU may receive a registration response. The registration response may comprise the information associated with the temporal availability of the network slice. The WTRU may determine (e.g., based on the temporal availability of the network slice) to stop use of a protocol data unit (PDU) session associated with the network slice. According to some aspects, the WTRU may store a (e.g., idle, connected, active, inactive, etc.) of the PDU Session. According to some aspects, uplink data associated with the PDU Session may be buffered or transmitted after a delay (e.g., based on the temporal availability of the network slice).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings.

DETAILED DESCRIPTION

Figure 1:
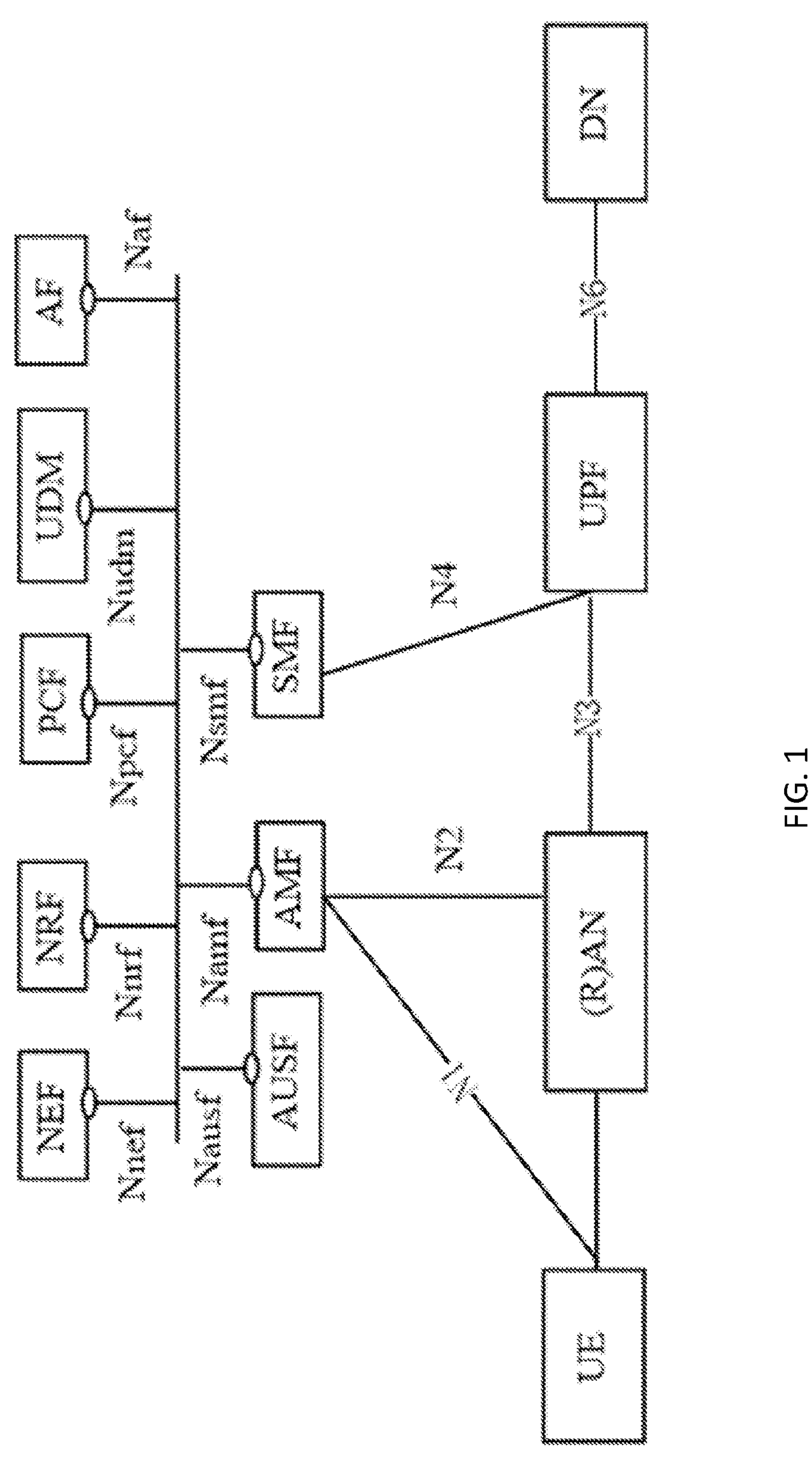
FIG. 1 shows an example 5G system service-based architecture.

Table 0.1 describes some of the abbreviations used herein.

TABLE 0.1

| Abbreviations | |
|---|---|
| 5GC | 5G Core |
| AF | Application Function |
| AISC | Application Interaction and Steering Capability |
| AMF | Access and Mobility Management Function |
| AS | Application Server |
| CN | Core Network |
| CP | Control Plane |
| DL | Downlink |
| DNN | Data Network Name |
| FR | Frequency Range |
| GUTI | Globally Unique Temporary Identifier |
| LTE | Long Term Evolution |
| MBMS | Multimedia Broadcast/Multicast Service |
| MCN | Mobile Core Network |
| MME | Mobility Management Entity |
| NAS | Non Access Stratum |
| NCMF | Network Capability Management Function |
| NEF | Network Exposure Function |
| NF | Network Function |
| NRF | NF Repository Function |
| NSC | Network Slice Customer |
| NSSAA | Network Slice Specific Authentication and Authorization |
| NSSA flags | Network Slice Selection for Application flags |
| NSSAI | Network Slice Selection Assistance Information |
| NSSF | Network Slice Selection Function |
| NSI | Network Slice Instance |
| NSP | Network Slice Provider |
| OFB | Operating Frequency Band |
| PAAA | Per-Application Authentication and Authorization |
| PCF | Policy Control Function |
| PLMN | Public Land Mobile Network |
| QoS | Quality of Service |
| RAN | Radio Access Network |
| RRM | Radio Resource Management |
| RFSP | RAT/Frequency Selection Priority |
| RSD | Route Selection Descriptor |
| SBA | Service Based Architecture |
| SCS | Service Capability Server |
| SD | Slice Differentiator |
| SM | Session Management |
| SMF | Session Management Function |
| SMSF | Short Message Service (SMS) Function |
| S-NSSAI | Single Network Slice Selection Assistance Information |
| EPID | Elevated Privilege Identifier |
| SRMC | Slice Resource Management Capability |
| SSAC | Simultaneous Slice Access Capability |
| SSAP | Simultaneous Slice Access Policies |
| SST | Slice/Service Type |
| SUPI | Subscription Permanent Identifier |
| TAC | Type Allocation Code |
| TSI | Temporal and Spatial Information |
| UDM/UDR | Unified Data Management/ Unified Data Repository |
| UE | User Equipment |
| UL | Uplink |
| UPF | User Plane Function |
| USAB | UE Slice Access Behavior |

Terms and Definitions.

The following is a list of terms that may appear in the following description. Unless otherwise specified, the terms used herein are defined as follows.

Network Slice—A logical network that provides specific network capabilities and network characteristics.

Network Slice Instance—A set of Network Function instances and the required resources (e.g., compute, storage and networking resources) which form a deployed Network Slice.

Service Area Restrictions—A Service Area Restriction may contain one or more (e.g., up to 16) entire Tracking Areas each or the Service Area Restriction may be set as unlimited (e.g., contain all Tracking Areas of the PLMN). The UE's subscription data in the UDM includes a Service Area Restriction which may contain either Allowed or Non-Allowed Areas-specified by using explicit Tracking Area identities and/or other geographical information (e.g., longitude/latitude, zip code, etc.).

Tracking Area—A tracking area is a set of cells. Tracking areas can be grouped into lists of tracking areas (TA lists), which can be configured on the User Equipment (UE). Tracking Areas (TA) is used for UE's access control, location registration, paging and mobility management.

Network Function (NF)—A processing function in a network, which has defined functional behavior and defined interfaces. An NF can be implemented either as a network element on a dedicated hardware, or as a software instance running on a dedicated hardware, or as a virtualized function instantiated on an appropriate platform, e.g., on a cloud infrastructure.

NF instance—An identifiable instance of the NF.

According to some aspects, FIG. 1 shows a non-roaming reference architecture with service-based interfaces within the Control Plane.

Figure 2:
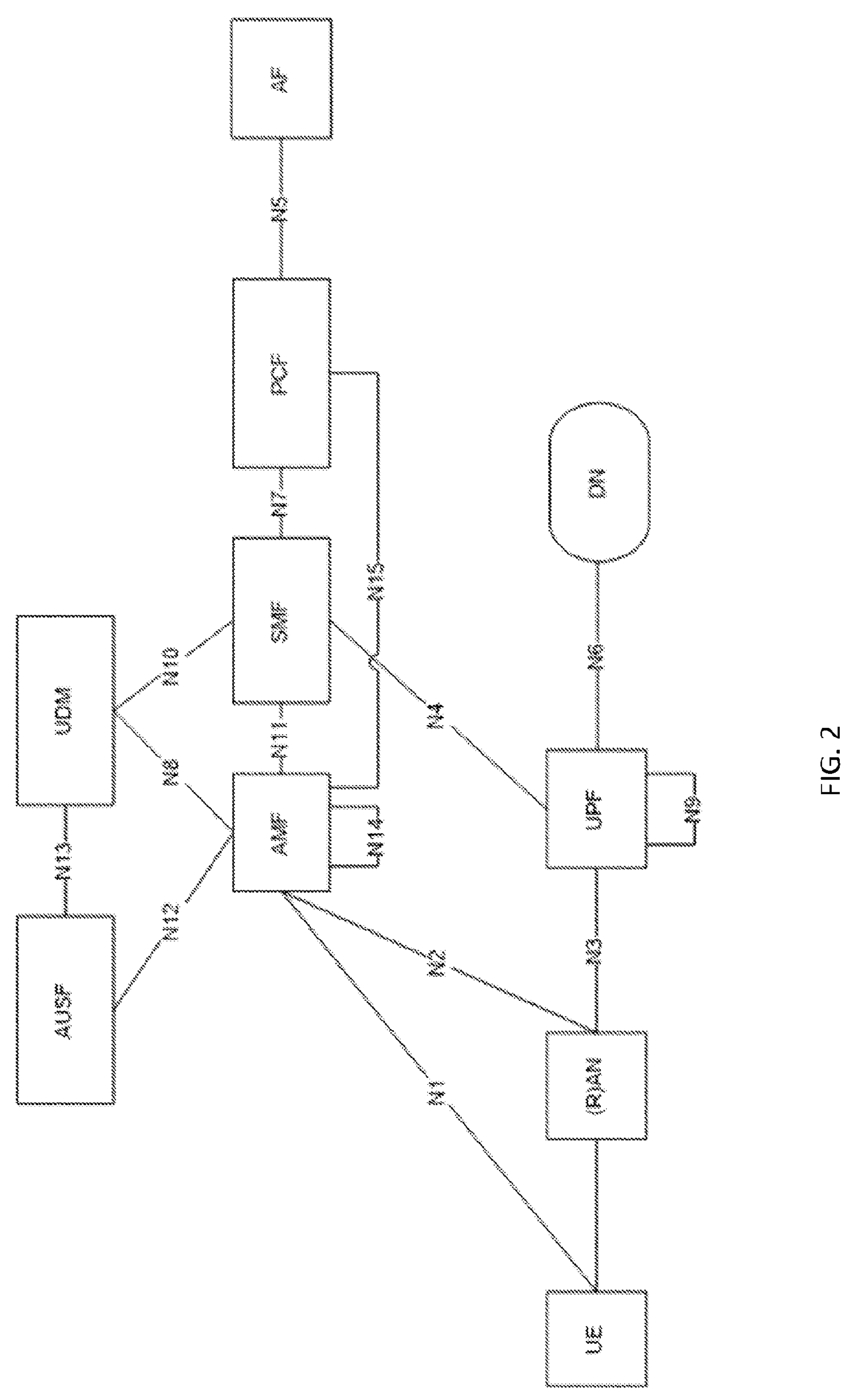
FIG. 2 shows an example non-roaming 5G system architecture in reference point representation.

According to some aspects, FIG. 2 shows the 5G System architecture in a non-roaming case, using the reference point representation depicting how various network functions interact with each other.

According to some aspects, the mobility management and session management functions are separated. A single N1 NAS connection may be used for both Registration Management and Connection Management and for Session Management (SM) related messages and procedures for a UE. The single N1 termination point may be located in AMF. The AMF may forward SM related NAS information to the SMF. The AMF may handle the Registration Management and Connection Management part of NAS signaling exchanged with the UE. SMF handles the Session management part of NAS signaling exchanged with the UE.

According to some aspects, the 5G System architecture is defined to support data connectivity and services enabling deployments to use techniques such as Network Function Virtualization and Software Defined Networking. According to some aspects, the 5G System architecture may leverage service-based interactions between Control Plane (CP) Network Functions where identified.

An NF is a processing function in a network, which may have defined functional behavior and defined interfaces. An NF may be implemented either as a network element on a dedicated hardware, or as a software instance running on a dedicated hardware, or as a virtualized function instantiated on an appropriate platform, e.g., on a cloud infrastructure.

A network slice is identified by an S-NSSAI, which may be comprised of:

(1) a Slice/Service type (SST), which may refer to the expected Network Slice behavior in terms of features and services; and (2) a Slice Differentiator (SD), which may be optional information that complements the Slice/Service type(s) to differentiate amongst multiple Network Slices of the same Slice/Service type.

According to some aspects, an S-NSSAI may have standard values (e.g., S-NSSAI may be only comprised of an SST with a standardized SST value, and no SD) or non-standard values (e.g., S-NSSAI may be comprised of either both an SST and an SD or only an SST without a standardized SST value and no SD). An S-NSSAI with a non-standard value may identify a single Network Slice within the PLMN with which it is associated. An S-NSSAI with a non-standard value may not be used by the UE in access stratum procedures in any PLMN other than the one to which the S-NSSAI is associated. Table 1 shows the standardized SST value.

According to some aspects, the NSSAI is a collection of S-NSSAIs. An NSSAI may be a Configured NSSAI, a Requested NSSAI or an Allowed NSSAI. There may be at most eight S-NSSAIs in Allowed and Requested NSSAI sent in signaling messages between the UE and the Network. The Requested NSSAI signaled by the UE to the network may allow the network to select the Serving AMF, Network Slice(s) and Network Slice instance(s) for this UE.

According to some aspects, based on the operator's operational or deployment needs, a Network Slice instance may be associated with one or more S-NSSAIs, and an S-NSSAI may be associated with one or more Network Slice instances. Multiple Network Slice instances associated with the same S-NSSAI may be deployed in the same or in different Tracking Areas. When multiple Network Slice instances associated with the same S-NSSAI are deployed in the same Tracking Areas, the AMF instance serving the UE may logically belong to (e.g., be common to) more than one Network Slice instance associated with this S-NSSAI.

According to some aspects, based on the Requested NSSAI (if any) and the Subscription Information, the 5GC may be responsible for selection of a Network Slice instance(s) to serve a UE including the 5GC Control Plane and User Plane Network Functions corresponding to this Network Slice instance(s).

According to some aspects, the (R)AN may use Requested NSSAI in access stratum signaling to handle the UE Control Plane connection before the 5GC informs the (R)AN of the Allowed NSSAI. The Requested NSSAI may be used by the RAN for AMF selection, as described in TS 23.501 [1], clause 6.3.5. The UE may not include the Requested NSSAI in the RRC Resume when the UE asks to resume the RRC connection and is CM-CONNECTED with RRC Inactive state.

According to some aspects, when a UE is successfully registered over an Access Type, the CN may inform the (R)AN by providing the Allowed NSSAI for the corresponding Access Type.

According to some aspects, standardized SST values may provide a way for establishing global interoperability for slicing so that PLMNs may support the roaming use case more efficiently for the most commonly used Slice/Service Types. For example, the SSTs which are standardized are in the following Table 1.

TABLE 1

| Standardized SST values | | |
|---|---|---|
| Slice/Service type | SST value | Characteristics |
| eMBB | 1 | Slice suitable for the handling of 5G enhanced Mobile Broadband. |
| URLLC | 2 | Slice suitable for the handling of ultra- reliable low latency communications. |
| MIoT | 3 | Slice suitable for the handling of massive IoT. |
| V2X | 4 | Slice suitable for the handling of V2X services. |

According to some aspects, configured NSSAI may be the NSSAI provisioned in the UE applicable to one or more PLMNs. A Configured NSSAI may be configured by a Serving PLMN and may apply to the Serving PLMN. According to some aspects, there may be at most one Configured NSSAI per PLMN.

According to some aspects, a Default Configured NSSAI may be configured by the HPLMN, e.g., may apply to any PLMNs for which no specific Configured NSSAI has been provided to the UE. The value(s) used in the Default Configured NSSAI may be expected to be commonly decided by all roaming partners. The Default Configured NSSAI, if it is configured in the UE, may be used by the UE in a Serving PLMN only if the UE has no Configured NSSAI for the Serving PLMN. The UE may be pre-configured with the Default Configured NSSAI.

According to some aspects, requested NSSAI may be the NSSAI provided by the UE to the Serving PLMN during registration. The S-NSSAIs in the Requested NSSAI may be part of the Configured and/or Allowed NSSAIs applicable for this PLMN, e.g., when they are available. If no Configured NSSAI and Allowed NSSAI for the PLMN are available, the S-NSSAIs in the Requested NSSAI may correspond to the Default Configured NSSAI, e.g., if configured in the UE.

According to some aspects, the Requested NSSAI signaled by the UE to the network may allow the network to select the Serving AMF, Network Slice(s) and Network Slice instance(s) for this UE. Based on the Requested NSSAI (if any) and the Subscription Information, the 5GC may be responsible for selection of a Network Slice instance(s) to serve a UE including the 5GC Control Plane and User Plane Network Functions corresponding to this Network Slice instance(s). The (R)AN may use Requested NSSAI in access stratum signaling to handle the UE Control Plane connection before the 5GC informs the (R)AN of the Allowed NSSAI According to some aspects, allowed NSSAI may be the NSSAI provided by the Serving PLMN during, for example, a Registration procedure, indicating the S-NSSAIs values the UE may use in the Serving PLMN for the current Registration Area. Upon successful completion of a UE's Registration procedure over an Access Type, the UE may obtain from the AMF an Allowed NSSAI for this Access Type, which includes one or more S-NSSAIs and, if needed (e.g., see clause 5.15.4.1.2), their mapping to the HPLMN S-NSSAIs. These S-NSSAIs may be valid for the current Registration Area and Access Type provided by the AMF the UE has registered with and may be used simultaneously by the UE (e.g., up to the maximum number of simultaneous Network Slice instances or PDU Sessions).

According to some aspects, the Mapping of Allowed NSSAI may be the mapping of each S-NSSAI of the Allowed NSSAI for the Serving PLMN to the HPLMN S-NSSAIs.

According to some aspects, the Mapping of Configured NSSAI may be the mapping of each S-NSSAI of the Configured NSSAI for the Serving PLMN to the HPLMN S-NSSAIs.

According to some aspects, a Network Slice may be defined as a logical network that provides specific network capabilities and network characteristics. A Network Slice within a PLMN may include the Core Network Control Plane and User Plane Network Functions. According to some aspects, Network Slice instance is defined as a set of Network Function instances and the required resources (e.g., compute, storage and networking resources) which form a deployed Network Slice.

According to some aspects, network slices may differ for supported features and network function optimizations, in which case such Network Slices may be of different Slice/Service Types. The operator may deploy multiple Network Slice instances delivering the same features but for different groups of UEs, e.g., as they deliver a different committed service and/or because they are dedicated to a customer, in which case such Network Slices may be of the same Slice/Service Type but may be distinguished through different Slice Differentiators.

According to some aspects, the network may serve a single UE with one or more Network Slice instances simultaneously via a 5G-AN and associated with at most eight different S-NSSAIs in total, regardless of the access type(s) over which the UE is registered (e.g., 3GPP Access and/or N3GPP Access). The AMF instance serving the UE may logically belong to each of the Network Slice instances serving the UE, e.g., this AMF instance is common to the Network Slice instances serving a UE.

According to some aspects, the Network Slice-Specific Authentication and Authorization procedure may be triggered for an S-NSSAI requiring Network Slice-Specific Authentication and Authorization with an AAA Server (AAA-S) which may be hosted by the H-PLMN operator or by a third party which has a business relationship with the H-PLMN, using the EAP framework. An AAA Proxy (AAA-P) in the HPLMN may be involved e.g., if the AAA Server belongs to a third party.

According to some aspects, this procedure may be triggered by the AMF during a Registration procedure when some Network Slices require Slice-Specific Authentication and Authorization, when AMF determines that Network Slice-Specific Authentication and Authorization is required for an S-NSSAI in the current Allowed NSSAI (e.g., subscription change), or when the AAA Server that authenticated the Network Slice triggers a re-authentication.

According to some aspects, the AMF may perform the role of the EAP Authenticator and communicates with the AAA-S via the Network Slice specific and SNPN Authentication and Authorization Function (NSSAAF). The NSSAAF may undertake any AAA protocol interworking with the AAA protocol supported by the AAA-S.

Figure 3:
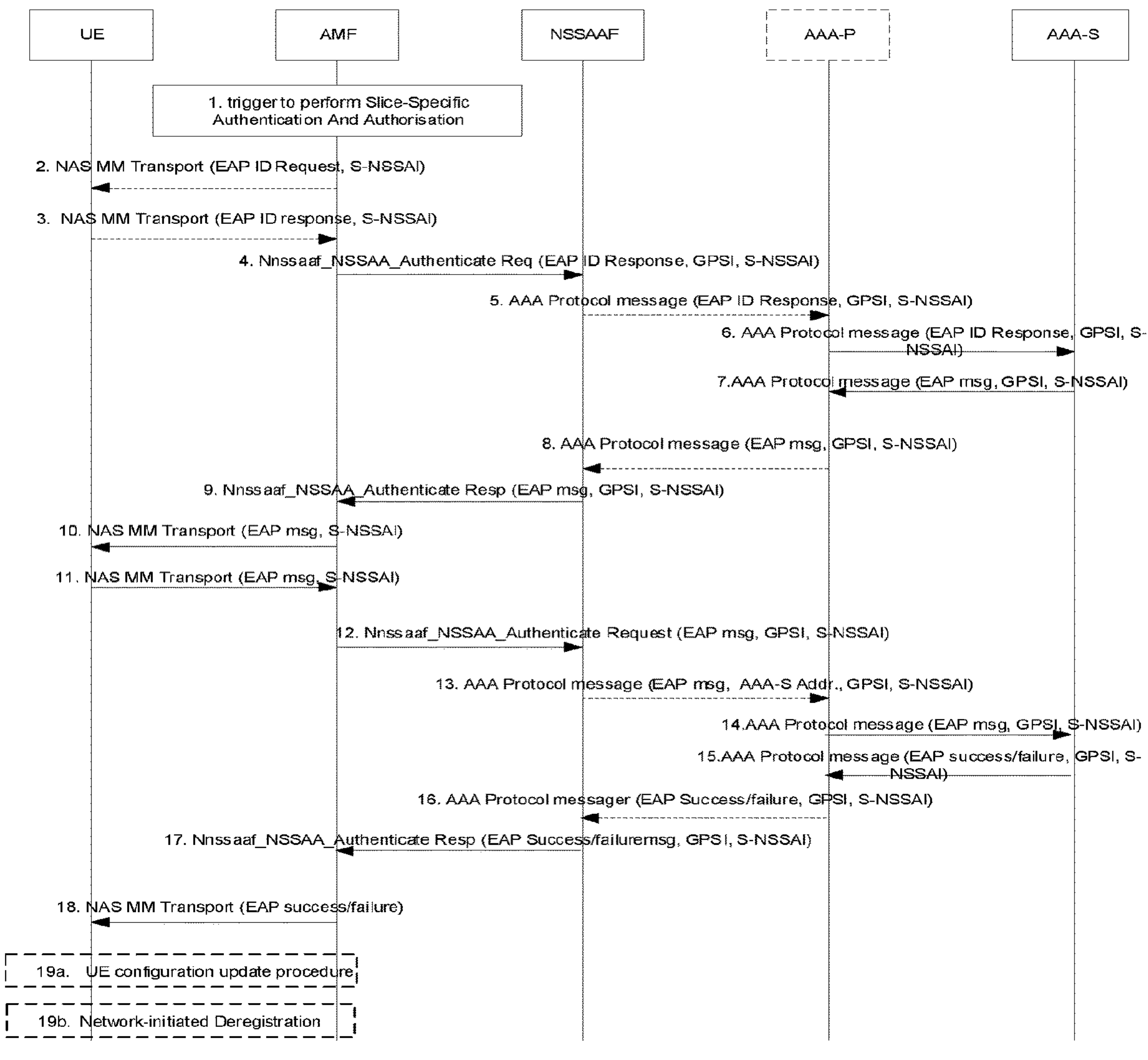
FIG. 3 shows an example network slice-specific authentication and authorization procedure.

According to some aspects, the Network Slice-Specific Authentication and Authorization procedure may require the use of a GPSI. For example, a subscription that contains S-NSSAIs subject to Network Slice-Specific Authentication and Authorization may include at least one GPSI. According to some aspects, FIG. 3 shows the call flow diagram of the NSSAA procedure (e.g., clause 4.2.9.2 of TS 23.502 [2]).

According to some aspects, the PDU Session establishment authentication/authorization may be optionally triggered by the SMF during a PDU Session establishment and performed transparently via a UPF or directly with the DN-AAA server without involving the UPF if the DN-AAA server is located in the 5GC and reachable directly (e.g., clause 5.6.6 of TS 23.501 [1]).

According to some aspects, in the case of Home Routed Roaming, unless specified otherwise, the SMF in the information flow defined in this clause is the H-SMF.

Figure 4:
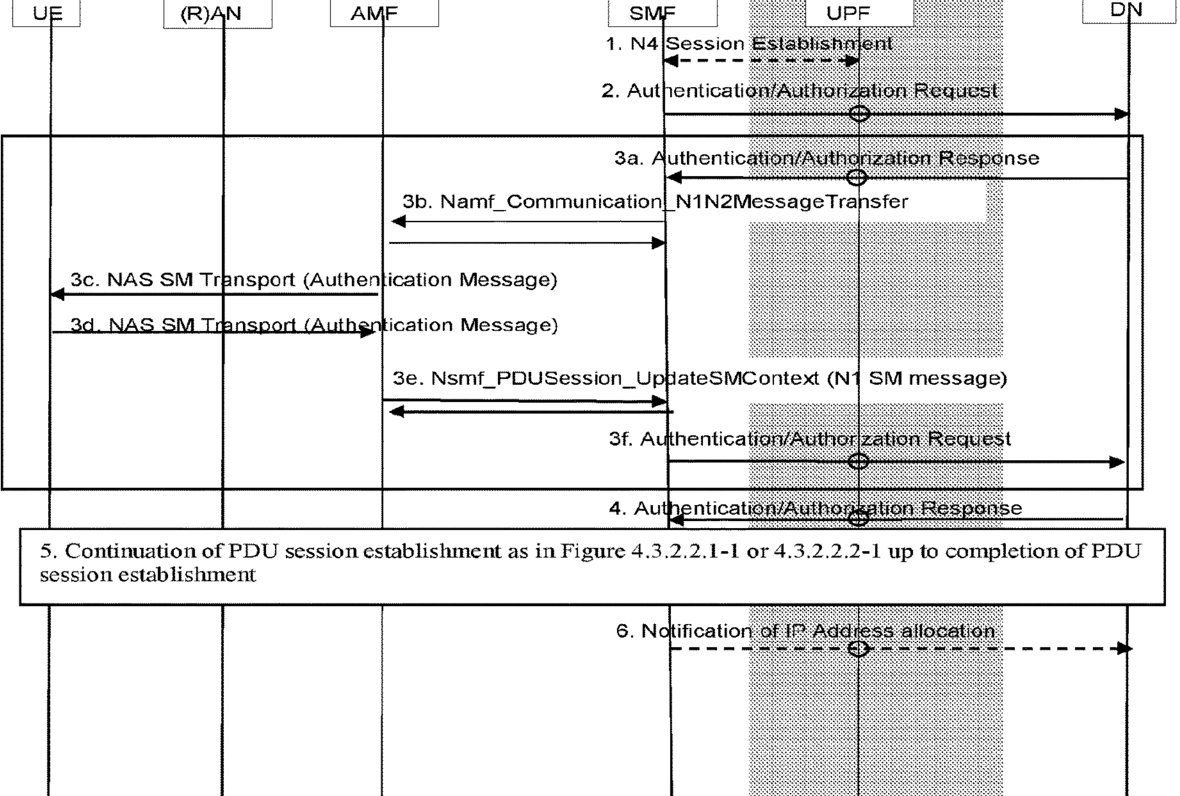
FIG. 4 shows an example method for PDU session establishment authentication/authorization by a DN-AAA server.

According to some aspects, Steps 2, 3a, 3f and 4 of FIG. 4 may be undefined. Step 3 may be repeated depending on the mechanism used. According to some aspects, when the SMF directly communicates with the DN-AAA server without involving the UPF, Step 1 may be skipped and Steps 2, 3a, 3f, 4 and 6 may be executed without involving the UPF. According to some aspects, the SMF may determine that it needs to contact the DN-AAA server. The SMF may identify the DN-AAA server based on local configuration or using the DN-specific identity (e.g., TS 33.501) provided by the UE inside the SM PDU DN Request Container provided by the UE in the PDU Session Establishment request or inside the EAP message in the PDU Session Authentication Complete message (e.g., TS 24.501).

According to some aspects, the content of the SM PDU DN Request Container is defined in TS 24.501. If there is no existing N4 session that may be used to carry DN-related messages between the SMF and the DN, the SMF may select a UPF and trigger N4 session establishment.

According to some aspects, the SMF may initiate the authentication procedure with the DN-AAA via the UPF to authenticate the DN-specific identity provided by the UE (e.g., as specified in TS 29.561). When available, the SMF may provide the GPSI in the signaling exchanged with the DN-AAA. The UPF may transparently relays the message received from the SMF to the DN-AAA server.

The steps for PDU Session Establishment authentication/authorization by a DN-AAA server may be described as follows:

Step 3a: The DN-AAA server may send an Authentication/Authorization message towards the SMF. The message may be carried via the UPF.

Step 3b: DN Request Container information received from DN-AAA may be transferred towards the UE. According to some aspects, in non-roaming and LBO cases, the SMF may invoke the Namf_Communication_N1N2MessageTransfer service operation on the AMF to transfer the DN Request Container information within N1 SM information sent towards the UE. According to some aspects, in the case of Home Routed roaming, the H-SMF may initiate a Nsmf_PDUSession_Update service operation to request the V-SMF to transfer DN Request Container to the UE and the V-SMF may invoke the Namf_Communication_N1N2MessageTransfer service operation on the AMF to transfer the DN Request Container information within N1 SM information sent towards the UE. In Nsmf_PDUSession_Update Request, the H-SMF may additionally include the H-SMF SM Context ID.

Step 3c: The AMF May Send the N1 NAS Message to the UE

Steps 3d-3e: DN Request Container information received from UE may be transferred towards the DN-AAA. According to some aspects, when the UE responds with a N1 NAS message containing DN Request Container information, the AMF may inform the SMF by invoking the Nsmf_PDUSession_UpdateSMContext service operation. The SMF may issue an Nsmf_PDUSession_UpdateSMContext response. In the case of Home Routed roaming, the V-SMF may relay the N1 SM information to the H-SMF using the information of PDU Session received in step 3b via a Nsmf_PDUSession_Update service operation.

Step 3f: The SMF (e.g., in HR case it is the H-SMF) may send the content of the DN Request Container information (e.g., authentication message) to the DN-AAA server via the UPF. According to some aspects, step 3 may be repeated until the DN-AAA server confirms the successful authentication/authorization of the PDU Session.

Step 4: The DN-AAA server may confirm the successful authentication/authorization of the PDU Session. According to some aspects, the DN-AAA server may provide: (1) an SM PDU DN Response Container to the SMF to indicate successful authentication/authorization; (2) DN Authorization Data (e.g. as defined in clause 5.6.6 of TS 23.501 [1]); (3) a request to get notified with the IP address(es) allocated to the PDU Session and/or with N6 traffic routing information or MAC address(es) used by the UE for the PDU Session; and/or (4) an IP address (or IPV6 Prefix) for the PDU Session.

According to some aspects, the N6 traffic routing information is defined in clause 5.6.7 of TS 23.501 [1].

According to some aspects, after the successful DN authentication/authorization, a session may be kept between the SMF and the DN-AAA. If the SMF receives a DN Authorization Data, the SMF may use the DN Authorization Profile Index to apply the policy and charging control (e.g., clause 5.6.6 of TS 23.501 [1]).

Step 5: The PDU Session establishment may continue and complete. For example, in step 7b of a figure TS 23.502 [2] that is identified in that document as 4.3.2.2.1-1, if the SMF receives the DN Authorization Profile Index in DN Authorization Data from the DN-AAA, it may send the DN Authorization Profile Index to retrieve the PDU Session related policy information (e.g., clause 6.4 of TS 23.503 [20]) and the PCC rule(s) (e.g., clause 6.3 of TS 23.503 [6]) from the PCF. According to some aspects, if the SMF receives the DN authorized Session AMBR in DN Authorization Data from the DN-AAA, it may send the DN authorized Session AMBR within the Session AMBR to the PCF to retrieve the authorized Session AMBR (e.g., clause 6.4 of TS 23.503 [6]). For PDU Session of Ethernet type, the SMF may instruct the UPF to handle VLAN information of the Ethernet frames related with the PDU Session received and sent on N6 or N19 or internal interface (e.g., clause 5.6.10.2 of TS 23.501 [1]).

Step 6: If requested so in step 4 or if configured so by local policies, the SMF may notify the DN-AAA with the IP/MAC address(es) and/or with N6 traffic routing information allocated to the PDU Session together with the GPSI.

According to some aspects, a Service Area Restriction may contain one or more (e.g., up to 16) entire Tracking Areas each or the Service Area Restriction may be set as unlimited (e.g., contain all Tracking Areas of the PLMN). The UE's subscription data in the UDM may include a Service Area Restriction which may contain either Allowed or Non-Allowed Areas-specified by using explicit Tracking Area identities and/or other geographical information (e.g., longitude/latitude, zip code, etc.). According to some aspects, the geographical information used to specify Allowed or Non-Allowed Area is only managed in the network, and the network may map it to a list of TAs before sending Service Area Restriction information to the PCF, NG-RAN and UE.

According to some aspects, when the AMF assigns a limited allowed area to the UE, the AMF may provide the UE with Service Area Restrictions which consist of either Allowed Areas or Non-Allowed Areas. The Allowed Areas included in the Service Area Restrictions may be pre-configured and/or dynamically assigned by the AMF.

According to some aspects, the Allowed Area may alternatively be configured as unlimited e.g., it may contain all Tracking Areas of the PLMN. The Registration Area of a UE in the Non-Allowed Area may consist of a set of TAs which belongs to a Non-Allowed Area of the UE. The Registration Area of a UE in the Allowed Area may consist of a set of TAs which belongs to an Allowed Area of the UE. The AMF may provide the Service Area Restriction in the form of TA(s), which may be a subset of full list stored in UE's subscription data or provided by the PCF, to the UE during the Registration procedure.

According to some aspects, the NG-RAN may prefer to use specific radio resources per data radio bearer(s), e.g., depending on the Network Slices associated to the data radio bearer used by the UE. The UE idle mode mobility control and priority-based reselection mechanism operates (e.g., clause 5.3.4.3.1 of TS 23.501), and when UP resources are activated (e.g., for a specific S-NSSAI) the NG-RAN may use local policies to decide on what specific radio resources to use for the associated data radio bearer(s). A UE may be served by a set of data radio bearers which may be served by cells in different bands, selected based on RRM policies.

According to some aspects, if a Network Slice is configured to be available only in TAs covering specific dedicated frequency band(s), then there may be a need to redirect the UE to the dedicated frequency band(s) when such S-NSSAI is requested. If the Requested NSSAI contains S-NSSAI(s) that are not available in the UE's current TA, the AMF itself or by interacting with the NSSF may determine a Target NSSAI to be used by the NG-RAN, to attempt to redirect the UE to a cell and TA in another frequency band and TA that supports the S-NSSAIs in the Target NSSAI. The Target NSSAI may include at least one S-NSSAI from the Requested NSSAI not available in the current TA, but available in another TA in different frequency band. The Target NSSAI may only include S-NSSAIs that may be provided in an Allowed NSSAI for the UE.

According to some aspects, if a Network Slice is configured to be available only in TAs covering specific dedicated frequency band(s), then there may be a need to redirect the UE to the dedicated frequency band(s) when such S-NSSAI is requested. If the Requested NSSAI contains S-NSSAI(s) that are not available in the UE's current TA, the AMF itself or by interacting with the NSSF may determine a Target NSSAI to be used by the NG-RAN, to attempt to redirect the UE to a cell and TA in another frequency band and TA that supports the S-NSSAIs in the Target NSSAI. The Target NSSAI may include at least one S-NSSAI from the Requested NSSAI not available in the current TA, but available in another TA in different frequency band. The Target NSSAI may only include S-NSSAIs that may be provided in an Allowed NSSAI for the UE.

According to some aspects, the NG-RAN may attempt to find cells of TAs that may support all the S-NSSAIs in the Target S-NSSAIs, and if no such cell of a TA is available, the RAN may attempt to select cells of TAs that best match the Target S-NSSAI. The NG-RAN may attempt to ensure continuity of the PDU Sessions with activated User Plane associated with the S-NSSAIs in the Allowed NSSAI which are in the Target NSSAI. Also, the NG-RAN may attempt to ensure continuity of service for the S-NSSAIs of the Allowed NSSAI also available in the Target NSSAI, before prioritizing cells that are not supporting one or more of the S-NSSAI of the Allowed NSSAI also available in the Target NSSAI.

According to some aspects, once the target cells are determined, the NG-RAN may initiate RRC redirection procedure towards the target cells, if possible.

According to some aspects, the UE Route Selection Policy (URSP) may include a prioritized list of URSP rules [6]. For example, Table 2 shows URSP. Moreover, an exemplary structure of the URSP rules is described in Table 3 and Table 4.

TABLE 2

| UE Route Selection Policy | | | | |
|---|---|---|---|---|
| Information name | Description | Category | PCF permitted to modify in a URSP | Scope |
| URSP rules | 1 or more URSP rules as specified in table 6.6.2.1-2 | Mandatory | Yes | UE context |

The structure of the URSP rules is described in Table 3 and Table 4 as follows:

TABLE 3

| UE Route Selection Policy Rule | | | | |
|---|---|---|---|---|
| Information name | Description | Category | PCF permitted to modify in a UE context | Scope |
| Rule Precedence | Determines the order the URSP rule is enforced in the UE. | Mandatory (NOTE 1) | Yes | UE context |

TABLE 3-continued

UE Route Selection Policy Rule

| Information name | Description | Category | PCF permitted to modify in a UE context | Scope |
|---|---|---|---|---|
| Traffic descriptor | This part defines the Traffic descriptor components for the URSP rule. | Mandatory (NOTE 3) | | |
| Application descriptors | It consists of OSId and OSAppId(s). (NOTE 2) | Optional | Yes | UE context |
| IP descriptors (NOTE 5) | Destination IP 3 tuple(s) (IP address or IPV6 network prefix, port number, protocol ID of the protocol above IP). | Optional | Yes | UE context |
| Domain descriptors | Destination FQDN(s) | Optional | Yes | UE context |
| Non-IP descriptors (NOTE 5) | Descriptor(s) for destination information of non-IP traffic | Optional | Yes | UE context |
| DNN | This is matched against the DNN information provided by the application. | Optional | Yes | UE context |
| Connection Capabilities | This is matched against the information provided by a UE application when it requests a network connection with certain capabilities. (NOTE 4) | Optional | Yes | UE context |
| List of Route Selection Descriptors | A list of Route Selection Descriptors. The components of a Route Selection Descriptor are described in table 6.6.2.1-3. | Mandatory | | |

(NOTE 1):
Rules in a URSP may have different precedence values.
(NOTE 2):
The information is used to identify the Application(s) that is(are) running on the UE's OS. The OSId does not include an OS version number. The OSAppId does not include a version number for the application.
(NOTE 3):
At least one of the Traffic descriptor components may be present.
(NOTE 4):
The format and some values of Connection Capabilities, e.g., "ims", "mms", "internet", etc., are defined in TS 24.526. More than one connection capabilities value can be provided.
(NOTE 5):
A URSP rule cannot contain the combination of the Traffic descriptor components IP descriptors and Non-IP descriptors.

TABLE 4

Route Selection Descriptor

| Information name | Description | Category | PCF permitted to modify in URSP | Scope |
|---|---|---|---|---|
| Route Selection Descriptor Precedence | Determines the order in which the Route Selection Descriptors are to be applied. | Mandatory (NOTE 1) | Yes | UE context |
| Route selection components | This part defines the route selection components | Mandatory (NOTE 2) | | |
| SSC Mode Selection | One single value of SSC mode. (NOTE 5) | Optional | Yes | UE context |
| Network Slice Selection | Either a single value or a list of values of S-NSSAI(s). | Optional (NOTE 3) | Yes | UE context |
| DNN Selection | Either a single value or a list of values of DNN(s). | Optional | Yes | UE context |
| PDU Session Type Selection | One single value of PDU Session Type | Optional (NOTE 8) | Yes | UE context |
| Non-Seamless Offload indication | Indicates if the traffic of the matching application is to be offloaded to non-3GPP access outside of a PDU Session. | Optional (NOTE 4) | Yes | UE context |

TABLE 4-continued

Route Selection Descriptor

| Information name | Description | Category | PCF permitted to modify in URSP | Scope |
|---|---|---|---|---|
| Access Type preference | Indicates the preferred Access Type (3GPP or non-3GPP or Multi-Access) when the UE establishes a PDU Session for the matching application. | Optional | Yes | UE context |
| Route Selection Validation Criteria (NOTE 6) | This part defines the Route Validation Criteria components | Optional | | |
| Time Window | The time window when the matching traffic is allowed. The RSD is not considered to be valid if the current time is not in the time window. | Optional | Yes | UE context |
| Location Criteria | The UE location where the matching traffic is allowed. The RSD rule is not considered to be valid if the UE location does not match the location criteria. | Optional | Yes | UE context |

(NOTE 1):
Every Route Selection Descriptor in the list may have a different precedence value.
(NOTE 2):
At least one of the route selection components may be present.
(NOTE 3):
When the Subscription Information contains only one S-NSSAI in UDR, the PCF needs not provision the UE with S-NSSAI in the Network Slice Selection information. The "match all" URSP rule has one S-NSSAI at most.
(NOTE 4):
If this indication is present in a Route Selection Descriptor, no other components may be included in the Route Selection Descriptor.
(NOTE 5):
The SSC Mode 3 may only be used when the PDU Session Type is IP.
(NOTE 6):
The Route Selection Descriptor is not considered valid unless all the provided Validation Criteria are met.
(NOTE 7):
In this Release of specification, inclusion of the Validation Criteria in Roaming scenarios is not considered.
(NOTE 8):
When the PDU Session Type is "Ethernet" or "Unstructured", this component may be present.

Figure 5:
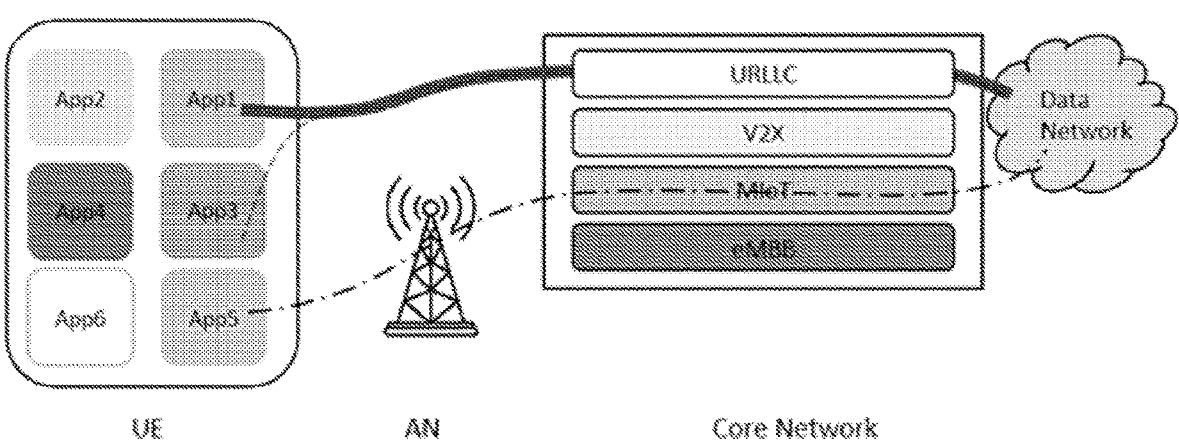
FIG. 5 shows an example method for UE Applications establishing PDU sessions with network slices.

According to some aspects, a UE such as a smartphone may acquire UE applications from one or more 3rd parties that may also provide services to the UE. The UE may establish multiple PDU sessions with the core network at a time. The PDU sessions are usually triggered by the applications in the UE. For example, when an application is started, the application may want to access a service from the application server in the data network. As shown in FIG. 5, an application App1 may establish a PDU session with a URLLC network slice, represented by a solid line in the FIGURE. A PDU session may be established based on URSP rules. If the URSP rules for App3 also indicated the same S-NSSAI (e.g., the URLLC slice) as its preferred slice in the PLMN, the UE may use the existing PDU session that App1 had previously established. There may be another application, e.g., App5, which may have triggered the UE to establish a separate PDU session with a different network slice as per the URSP Rules.

Figure 6:
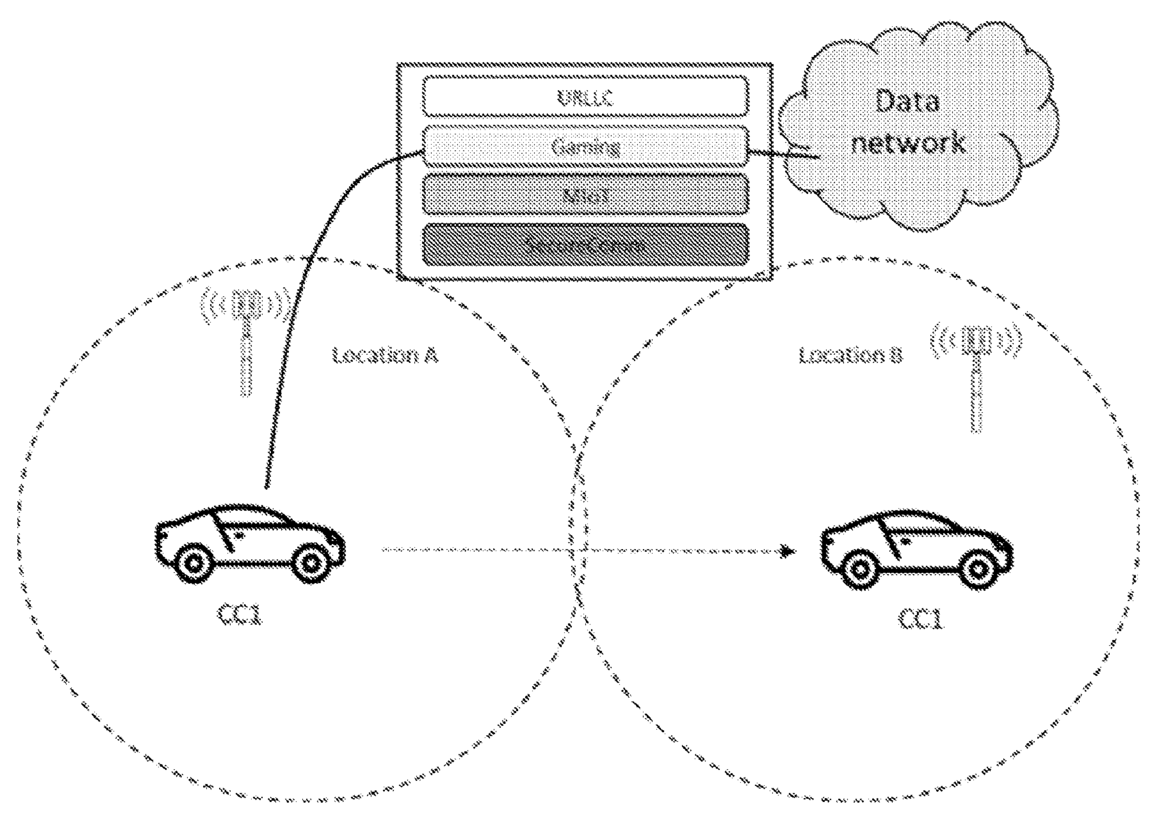
FIG. 6 shows an example connected car not having access to an authorized slice in a new location.

According to some aspects, a mobile UE such as a connected car may have established PDU sessions with one or more network slices in the core network. As the UE moves, it may come across a new location (e.g., TA/RA) where UE may lose access and may not have access to any authorized network slices. As shown in FIG. 6, a vehicular UE (CC1) in Location A, which was accessing a Gaming slice may not have access to any slice at Location B.

According to some aspects, a URSP rule in the UE may guide an application in the UE to use a PDU session which may have been established by another (e.g., first) application as depicted in FIG. 5. The second application may belong to a different 3rd party and therefore may need to be authorized before it uses the network slice. Current 5GS specification does not define how 5GS conducts per-application authentication and authorization for accessing network slices or DNs.

According to some aspects, a UE may have had an ongoing PDU session with one or more network slices. When a UE moves to a new location (e.g., TA, RA, etc.), the UE may not have access to any authorized network slices in the new location. Current 5GS does not describe how the UE may handle such a scenario so that UE may be able to inform the UE applications that slices may become unavailable and that the applications may gracefully terminate or save their state (e.g., idle, connected, active, inactive, etc.). Additionally, 5GS does not describe how a UE may save power by reducing undesired application activities in the UE in such scenarios.

According to some aspects, when a UE application starts, it may trigger the UE to establish a PDU session with the network. A PDU session may involve accessing a data network via a network slice. Each UE application may have been installed in the UE for different services (e.g., gaming, video, IoT control, etc.) offered by various 3rd parties and hence, may require varying level of resources for performance, privacy, etc. The data network and/or the network slice may require an application to be authorized before receiving a service via an application function using a slice. Hence, the 5G System may need a Per-Application Authentication and Authorization (PAAA) procedure. These following sections describe methods for PAAA.

According to some aspects, a network slice may need to be marked with an indicator for a UE application to identify that the network slice is subject to Per-Application Authentication and Authorization. The MNO may mark a network slices with a PAAA indicator that are subject to PAAA during network slice configuration. The UE may have received the S-NSSAIs with PAAA indicators as part of the Allowed NSSAI after a successful UE Registration. Alternatively, the PAAA indicators may be sent to the UE with the Configured NSSAI.

Figure 7:
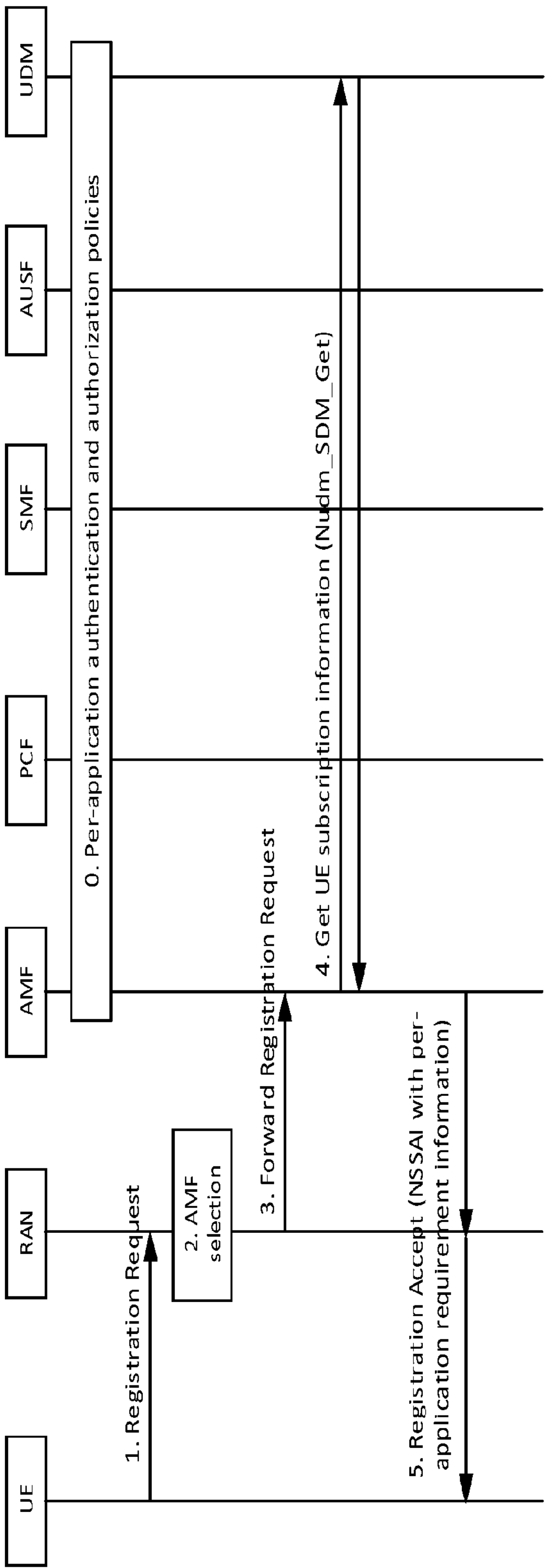
FIG. 7 shows an example UE receiving allowed NSSAI with PAAA indicators at registration.

When an application triggers a PDU session, the UE may identify that the selected network slice is subject to PAAA based on the PAAA indicator. According to some aspects, FIG. 7 shows an enhanced UE registration procedure when a PAAA indicator is conveyed to the UE.

In Step 0, each S-NSSAI that is subject to PAAA may be associated with a Per-Application Authentication and Authorization (PAAA) indicator in the UE's UE Access and Mobility Subscription at the UDM/UDR. According to some aspects, PAAA requirement for slice access may depend on factors such as MNO's agreement with third parties on services, security requirements, local policies, etc.

According to some aspects, a PAAA information that is associated with a slice may be an indication of whether a slice needs PAAA from a UE. PAAA information may be implemented as a flag that is either Set or Not Set for a UE. A set flag may indicate that the slice is subject to PAAA and a flag Not Set may indicate that PAAA is not required to access that slice from the UE.

In Step 1, the UE may send a Registration Request towards the AMF via RAN (e.g., step 1 of section 4.2.2.2.2 of TS 23.502). In this request, a UE may also indicate its support for PAAA.

According to some aspects, the request may include a Requested NSSAI. In the case of Initial Registration or Mobility Registration Update, the UE may include the Mapping of Requested NSSAI (if available), which may be the mapping of each S-NSSAI of the Requested NSSAI to the HPLMN S-NSSAIs, to ensure that the network is able to verify whether the S-NSSAI(s) in the Requested NSSAI are permitted based on the Subscribed S-NSSAIs.

In Step 2, the RAN may select an AMF (e.g., TS 23.501 [1], clause 6.3.5).

In Step 3 the Registration Request may be forwarded to the selected AMF.

In Step 4, if the AMF does not have subscription data for the UE, the AMF may retrieve the Access and Mobility Subscription data, SMF Selection Subscription data, UE context in SMF data, etc. using Nudm_SDM_Get. The UE subscription information retrieved from the UDM may contain a set of S-NSSAIs that UE is subscribed to, each of which may contain a PAAA indication.

In Step 5 the AMF may send a Registration Accept message to the UE via (R)AN node. The Registration Accept may include the Allowed NSSAI for the UE with each S-NSSAI configured with PAAA indicator. If the indicator is a flag and an S-NSSAI is subject to PAAA for the UE, the flag may be Set. Otherwise, the flag may be Not Set.

In addition, the AMF may also send Mapping of Allowed NSSAI with each S-NSSAI and PAAA indicator, Configured NSSAI for the Serving PLMN with each S-NSSAI and its PAAA indicator, and Mapping of Configured NSSAI with each S-NSSAI and its corresponding PAAA indicator. The (R)AN node may forward Registration Accept to the UE.

Figure 8:
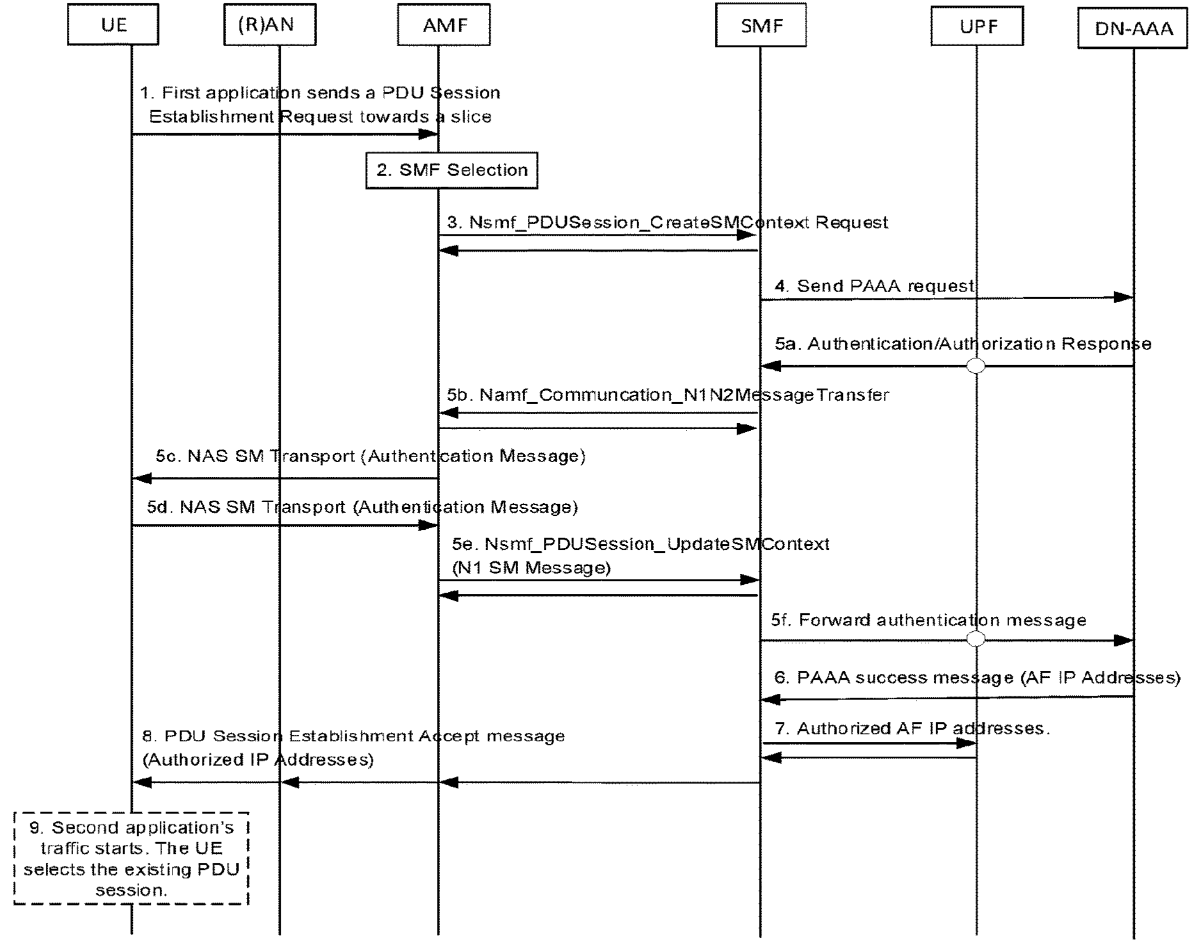
FIG. 8 shows an example method for per-application authentication and authorization.

The current 5G System design only considers per UE authentication and authorization if a network slice needs NSSAA. However, each application may affect access to an application function or data network. Thus, an application's permission to access a network slice for a UE is coupled with the application's permission to access an application function/DN. This section describes methods by which core network authenticates and authorizes each application attempting to access a network slice and an AF/DN. FIG. 8 shows an exemplary procedure and is described as follows.

In Step 1, a first application in the UE, e.g., App1, starts a traffic. The UE determines that it needs to establish a PDU session. App1 may provide a traffic descriptor to the UE. A traffic descriptor may be an application descriptor, IP descriptor/address, a DNN, etc. (e.g., Table 6.6.2.1-2 of TS 23.503). The UE may evaluate the URSP rule which consists of the traffic descriptor that App 1 provided. An RSD in the URSP rule may contain an S-NSSAI. Provided that the S-NSSAI includes a PAAA indicator as described in FIG. 3, UE may identify that any PDU session established in that slice needs to go through the PAAA procedure.

According to some aspects, the UE may send a PDU Session Establishment Request to the AMF via RAN indicating a network slice selected based on the URSP rule. The request may also include an application descriptor. The application descriptor may be a traffic descriptor that was used in URSP evaluation or an application identifier such as OSId and OSAppId(s). The UE may also include in the request the DN-specific identity inside the SM PDU DN Request Container. The DN-specific identity may be associated with the Application and identify the instance of the application on the UE.

The UE may optionally include a PAAA Trigger Indicator in the PDU session request. The PAAA Trigger Indicator may be later used to inform the SMF to trigger the PAAA process.

The Applications Descriptor may consist of one or more IP Addresses, Port Numbers, or MAC addresses that indicate what servers the PDU Session will be used to send and receive traffic from.

The Application Descriptor may include a Service Provider ID. The network and UE may be pre-configured to associate the Service Provider ID with one or more IP Addresses, Port Numbers, or MAC addresses. Thus, the Service Provider ID may be used by the UE to indicate to the network what servers the PDU Session will be used to send and receive traffic from.

The Application Descriptor may include one or more Application Identifier(s) that identify the UE Applications that will use the PDU Session. The format of the Application Identifiers may be a 3GPP External Identifier.

In Step 2, The AMF may determine that the message corresponds to a request for a new PDU Session wherein the Request Type indicates "initial request" and that the PDU Session ID is not used for any existing PDU Session of the UE. The AMF selects an SMF (e.g., clause 6.3.2 of TS 23.501 [1]).

In Step 3, the AMF may invoke the Nsmf_PDUSession-_CreateSMContext Request if the AMF does not have an association with an SMF for the PDU Session ID provided by the UE (e.g., when Request Type indicates "initial request"), the AMF may invoke the Nsmf_PDUSession-_CreateSMContext Request.

In Step 4, based on the request from the UE that includes the application descriptor and S-NSSAI (e.g., S-NSSAI-A) that the UE wants to access and, the PAAA Trigger Indicator from the UE, the SMF may trigger the PAAA process. Alternatively, the SMF may trigger PAAA process based on the policy received from the PCF. SMF may determine that it needs to contact the DN-AAA server for PAAA procedure. The SMF may identify the DN-AAA server based on local configuration, Application Descriptor, or using the DN-specific identity and sends the application descriptor with the request for PAAA to the DN-AAA server.

In Step 5a, the DN-AAA server may send an Authentication/Authorization message intended for the UE towards the SMF via the UPF.

In Step 5b, the SMF may transfer the DN Request Container information received from DN-AAA towards the UE by invoking the Namf_Communication_N1N2MessageTransfer service operation on the AMF within N1 SM information for LBO or non-roaming case.

For the Home Routed roaming, H-SMF may initiate a Nsmf_PDUSession_Update service operation to request the V-SMF to transfer DN Request Container to the UE and the V-SMF invokes the Namf_Communication_N1N2MessageTransfer service operation on the AMF to transfer the DN Request Container information within N1 SM information sent towards the UE.

In Step 5c, the AMF may send the N1 NAS message to the UE.

In Step 5d, the UE may respond to the AMF with a N1 NAS message containing DN Request Container information.

In Step 5e, the AMF may inform the SMF by invoking the Nsmf_PDUSession_UpdateSMContext service operation. The SMF may issue an Nsmf_PDUSession_UpdateSMContext response.

In the case of Home Routed roaming, the V-SMF may relay the N1 SM information to the H-SMF using the information of PDU Session received via a Nsmf_PDUSession_Update service operation.

In Step 5f, the SMF (or the H-SMF in Home Router case) may send the content of the DN Request Container information (authentication message) to the DN-AAA server via the UPF.

According to some aspects, step 5 may be repeated until DN-AAA gets all the required information from the UE to confirm successful authentication and authorization of PDU session.

In Step 6, the DN-AAA server may send a PAAA success message towards the SMF. In addition to a PAAA success message, the DN-AAA server may send a set of IP addresses, port numbers, and MAC Addresses of application functions (AF), IP addresses for DNS, etc., to the SMF that the UE may access using the network slice.

According to some aspects, if App1 is not authenticated, the SMF may reject the PDU session request. However, if the application is authenticated but not authorized for accessing a particular AF in question, the SMF may accept the PDU session request, but in the PDU Session Accept message, the SMF may send the list of IP addresses (e.g., AFs) received from the DN-AAA that the UE is allowed to access using App1.

In Step 7, the SMF may send an N4 Session Establishment/Modification Request to the UPF and provide Packet detection, enforcement and reporting rules to be installed on the UPF for this PDU Session. The SMF may indicate to the UPF to perform the IP address/prefix allocation, and include the information required for the UPF to perform the allocation. This request may comprise the IP addresses, port numbers, and MAC Addresses of the AFs received from the DN-AAA server. This information may be used by the UPF to determine what addresses the PDU Session may be used to send/receive traffic. The UPF may acknowledge by sending an N4 Session Establishment/Modification Response. The N4 Session Establishment/Modification Request may also indicate to the UPF that all downlink traffic to the UE may be allowed, but that uplink traffic is only allowed to the indicated IP addresses, port numbers, and MAC Addresses. It may be useful to allow downlink traffic to the UE so that servers may initiate contact with the UE; the UE may then be authenticated when it attempts to send uplink traffic to a new destination.

In Step 8, the SMF may send to the AMF a PDU Session Establishment Accept message in the N1 SM container that the AMF may provide to the UE. In addition, the SMF may send to the UE, the IP Addresses, port numbers, and MAC Addresses for the AFs for which the UE is authorized to use the PDU Session to contact (e.g., send and receive traffic from).

The AMF may forward the PDU Session Establishment Accept message and the AF IP Addresses, port numbers, and MAC Addresses to the UE via the RAN.

In step 9, a second application, App2, may generate uplink traffic. App2 however, may not be authorized to use the same slice as App1. In current 5G system, App2 may be able to utilize the PDU session of any other application (e.g., App1) if there is a match in URSP traffic descriptor. The following section describes how traffic from App2 may be handled when the app requires a PAAA.

According to some aspects, in Step 9 of FIG. 8, the UE has already received with a PDU Session Establishment Accept message, a set of authorized IP addresses for the AFs that the UE may contact via the PDU session using a particular S-NSSAIs. For example, App1 may have an ongoing PDU session via a network slice (e.g., S-NSSAI-A).

A second application (App2) traffic may start. App2 may provide a Traffic descriptor (e.g., OSid, DNN, IP address, etc.) to the UE. The UE may evaluate a URSP rule and determine that there is an existing PDU session towards an S-NSSAI and DNN that matches with the S-NSSAI and DNN in the URSP rule. However, the UE may learn that the UE is not authorized to access the network slice because the traffic descriptor that the UE is trying to access is an AF (IP address) that is not authorized for this PDU Session using the S-NSSAI (e.g., S-NSSAI-A). In other words, the IP Address that App2 is trying to send data towards may not be among the authorized IP Addresses that was received in the PDU Session Establishment Accept Message described in Step 8 of FIG. 8.

On the other hand, the UE may be authorized to access IP address (e.g., AFs) using a corresponding network slice where UE has established a PDU session for App1.

According to some aspects, another alternative to trigger the PAAA process is to conFIG. a PAAA Trigger Indicator information in the URSP rule, such that the UE could send a new PDU session request with a PAAA Trigger Indicator, which would trigger the PAAA procedure in the SMF. Yet another alternative is to conFIG. SMF locally with a PAAA Trigger Indicator or the SMF may obtain information or policy from another NF such as the PCF or UDM to trigger the PAAA procedure.

Figure 9:
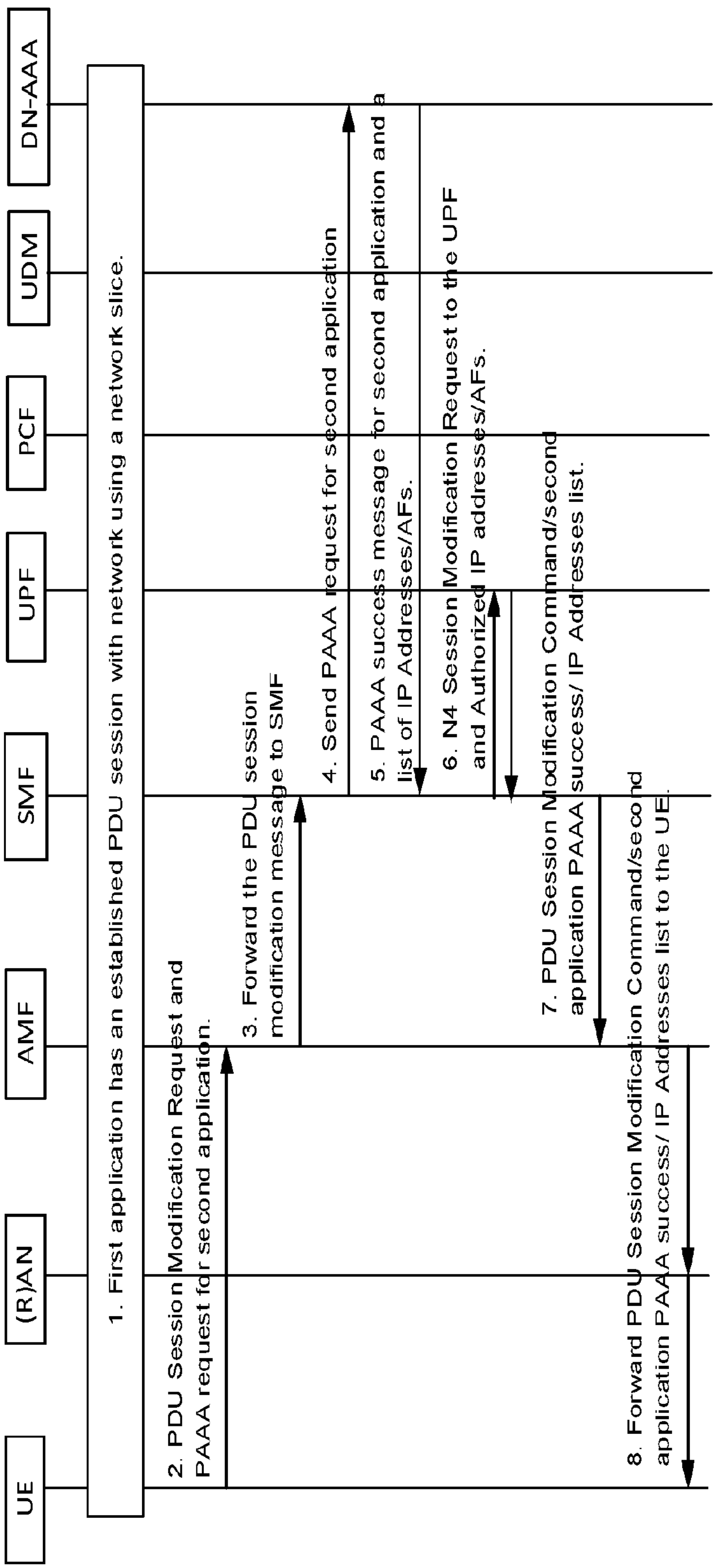
FIG. 9 shows an example PAAA request with PDU session modification.

According to some aspects, the UE may use an existing PDU session than establishing a new PDU session. When the UE identifies that a second UE application does not have authorization to access the network slice and the AF using an existing PDU session established by another application, based on the authorized AF/DN IP addresses received from the DN-AAA server, it may be more efficient for the UE to send a PDU Session Modification Command with a request for PAAA for the second application such that if the UE successfully completes a PAAA process, the PDU session is modified and the UE may incorporate traffic originating from second application in the PDU session. FIG. 9 shows a call-flow describing a method for PAAA with PDU Session Modification.

In Step 1, a first application (App1) may have already established a PDU session towards an AF/DN using a network slice (S-NSSAI-A) as described in FIG. 8.

In Step 2, a second app (App2) may start traffic. The UE may determine while evaluating a URSP rule that App2 should use the same PDU Session that was already established for App1 but that App2 is not authorized to access an AF based on the authorized IP Addresses for AFs received in Step 1.

Hence, the UE may send a PDU Session Modification NAS Message towards the network. The PDU Session Modification Message may include a PDU Session Modification Request, PDU Session ID, Requested QoS, etc. Along with the PDU Session Modification Message the UE may include the new Application Descriptor (e.g., for App2) and a PAAA Trigger Indicator indicating a need for PAAA.

In Step 3, the AMF may forward the PDU session modification message to the SMF. Based on the request and the Application Descriptor and/or PAAA Trigger Indicator received from the UE, the procedure Per-Application Authentication and Authorization (PAAA) may be triggered at the SMF. The SMF may alternatively trigger the PAAA procedure based on information provided by another NF such as the PCF and/or the UDM.

In Step 4, the SMF may send a PAAA Request to the DN-AAA server.

In Step 5, the DN-AAA server may determine that the App2 is authorized to access the AF. The DN-AAA server may send back the PAAA Success message to the SMF.

In Step 6, the SMF may send an N4 Session Modification Request to the UPF and provides Packet detection, enforcement, and reporting rules to be installed on the UPF for matching PDU Session. The SMF may indicate to the UPF to perform the IP address/prefix allocation, and includes the information required for the UPF to perform the allocation. This may comprise the IP addresses, Port Numbers, and MAC Addresses of the AFs received from the DN-AAA server, where the UPF is allowed to establish PDU Session to send/receive traffic. The UPF may acknowledge by sending an N4 Session Establishment/Modification Response.

In Step 7 the SMF may respond to the AMF through Nsmf_PDUSession_UpdateSMContext Response, which may contain the N1 SM container (PDU Session Modification Command). The N1 SM container may carry the PDU Session Modification Command that the AMF may provide to the UE. It may include the QoS rules, Qos Flow level QoS parameters if needed for the QoS Flow(s) associated with the QoS rule(s) and corresponding QoS rule operation and QoS Flow level QoS parameters operation to notify the UE that one or more QoS rules were added, removed or modified. In addition, the N1 SM container may include the PAAA Success message. Along with the PDU Session Modification command sent to the UE, the SMF may include a message indicating a successful authorization of application App2. In addition, the message may include an updated list of IP Addresses, Port Numbers, and MAC Addresses (e.g., AFs) the PDU Session is authorized to send traffic using App2.

In Step 8, the AMF may send N2, e.g., [N2 SM information received from SMF], NAS message (PDU Session ID, N1 SM container (PDU Session Modification Command, PAAA Success message, and updated list of IP Addresses, Port Numbers, and MAC Addresses (e.g., AFs) the PDU Session is authorized to send traffic using App2)), Message to the (R)AN. RAN may transport only the N1 SM container to the UE.

App2 may start sending data using the same PDU session, which may include the network slice and the AF, e.g., that App1 was using. The UE may keep the authorized IP Addresses (e.g., AFs) for until the authorized App is killed or clear them based on UE behavior policies (if any) or based on local policies.

According to some aspects, the UE may receive the updated URSP rules and (re-)evaluate their validities in a timely manner when certain conditions such as when UE registers over 3GPP or non-3GPP access; change of Allowed NSSAI or Configured NSSAI and the URSP may be updated by the PCF (e.g, TS 23.503).

According to some aspects, the URSP rules may be used to determine if an existing or a new PDU Session is required. The MNO itself or an agreement between the MNO and a 3rd party entity may determine which network slice(s) would access what AFs/DNs and if the application requires a PAAA to access the AFs/DNs using that network slice.

According to some aspects, when a UE attempts to establish a PDU session and evaluates a URSP rule, a network slice selection may be conducted using network slice selection policy (NSSP) within a URSP. The NSSP may ensure that the traffic of the matching application may be routed via a PDU Session supporting any of the included S-NSSAIs. The URSP may be enhanced with a proposed Network Slice Selection for Application flags (NSSA flags), such that any slice that needs a PAAA may be indicated in the URSP rule with the NSSA flags Set. The NSSP may be independent of NSSA flags in that the NSSA flags doesn't impact the UE's network slice selection decision. However, As the UE selects an S-NSSAI, the UE may check if the NSSA flag is Set for that S-NSSAI.

A flag may be Not Set if an S-NSSAI does not require a PAAA. According to some aspects, a flag may act as an indicator and may be meant for each S-NSSAI if there is a list of S-NSSAIs in a URSP rule. Hence for a URSP, each S-NSSAI may have a separate NSSA flag. According to some aspects, Table 5 shows an enhanced URSP rules with NSSA flags.

TABLE 5

An Enhanced Route Selection Descriptor

| Information name | Description | Category | PCF permitted to modify in URSP | Scope |
|---|---|---|---|---|
| Route Selection Descriptor Precedence | Determines the order in which the Route Selection Descriptors are to be applied. | Mandatory (NOTE 1) | Yes | UE context |

TABLE 5-continued

An Enhanced Route Selection Descriptor

| Information name | Description | Category | PCF permitted to modify in URSP | Scope |
|---|---|---|---|---|
| Route selection components | This part defines the route selection components | Mandatory (NOTE 2) | | |
| SSC Mode Selection | One single value of SSC mode. (NOTE 5) | Optional | Yes | UE context |
| Network Slice Selection | Either a single value or a list of values of S-NSSAI(s). | Optional (NOTE 3) | Yes | UE context |
| DNN Selection | Either a single value or a list of values of DNN(s). | Optional | Yes | UE context |
| PDU Session Type Selection | One single value of PDU Session Type | Optional (NOTE 8) | Yes | UE context |
| Non-Seamless Offload indication | Indicates if the traffic of the matching application is to be offloaded to non-3GPP access outside of a PDU Session. | Optional (NOTE 4) | Yes | UE context |
| Access Type preference | Indicates the preferred Access Type (3GPP or non-3GPP or Multi-Access) when the UE establishes a PDU Session for the matching application. | Optional | Yes | UE context |
| NSSA flags | Indicates if the requesting application needs to go through PAAA procedure. | Optional | Yes | UE context |
| Route Selection Validation Criteria (NOTE 6) | This part defines the Route Validation Criteria components | Optional | | |
| Time Window | The time window when the matching traffic is allowed. The RSD is not considered to be valid if the current time is not in the time window. | Optional | Yes | UE context |
| Location Criteria | The UE location where the matching traffic is allowed. The RSD rule is not considered to be valid if the UE location does not match the location criteria. | Optional | Yes | UE context |

(NOTE 1):
Every Route Selection Descriptor in the list may have a different precedence value.
(NOTE 2):
At least one of the route selection components may be present.
(NOTE 3):
When the Subscription Information contains only one S-NSSAI in UDR, the PCF needs not provision the UE with S-NSSAI in the Network Slice Selection information. The "match all" URSP rule has one S-NSSAI at most.
(NOTE 4):
If this indication is present in a Route Selection Descriptor, no other components may be included in the Route Selection Descriptor.
(NOTE 5):
The SSC Mode 3 may only be used when the PDU Session Type is IP.
(NOTE 6):
The Route Selection Descriptor is not considered valid unless all the provided Validation Criteria are met.
(NOTE 7):
In this Release of specification, inclusion of the Validation Criteria in Roaming scenarios is not considered.
(NOTE 8):
When the PDU Session Type is "Ethernet" or "Unstructured", this component may be present.

Figures 10, 11:
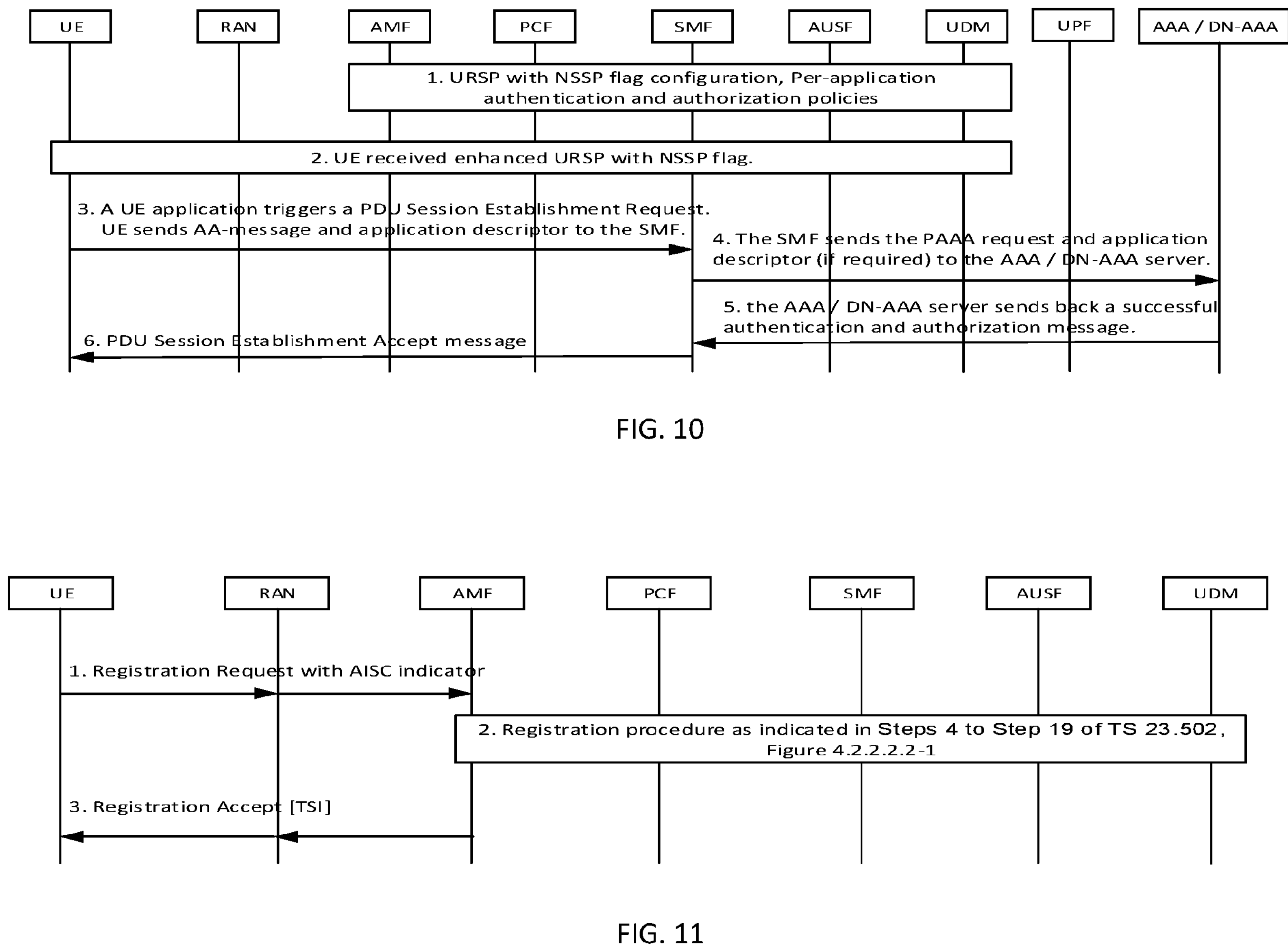
FIG. 10 shows an example method for an enhanced URSP to guide a UE for PAAA.
FIG. 11 shows an example of method for conveying temporal and spatial information to the UE during UE registration.

According to some aspects, each time an application traffic leads to a PDU session, and the UE evaluates the URSP rule, the UE may attempt to select an S-NSSAI(s) from the URSP rule using the NSSP. The RSD of the URSP may be enhanced such that the UE also checks if the NSSA flag for a particular S-NSSAI is Set. If the NSSA flag is set for that S-NSSAI, the UE may determine that the application needs to be authenticated and authorized for a successful PDU session via corresponding S-NSSAI. The NSSA flag also means that the UE needs to send an application descriptor for the UE application (e.g., App ID) along with an indicator specifying a need for PAAA in the PDU Session Request to the core network (AMF or SMF). The procedure is described in FIG. 10.

In Step 1, the MNO may configure. core network with PAAA policies. The SMF may be responsible to conduct the PAAA procedure for an application requesting a PDU session establishment. PAAA policies may ensure whether and how SMF needs to contact the AAA/DN-AAA server for application authentication and authorization.

In addition, NSSA flags in the URSP rules may also be Set for S-NSSAIs that requires PAAA based on local policies or any agreement with 3rd party entities.

In Step 2, the UE may receive the enhanced URSP rules from the core network when the UE registers over 3GPP or non-3GPP access, when there is a change of Allowed NSSAI or Configured NSSAI for the UE, when UE moves from EPC to 5GC; when the URSP is updated by the PCF, etc. (e.g., TS 23.503).

In Step 3, when an application starts and triggers the UE to establish a PDU session, the UE may evaluate the URSP rules. Provided that the NSSA flag is Set for the S-NSSAI where the UE is attempting to establish a PDU session, the UE may determine, based on the Set NSSA flag that it needs to send the application descriptor (e.g., App ID) to the core network. Hence, the UE may send an application descriptor in an authentication and authorization message (AA-message) indicating a need for PAAA in the PDU Session Establishment Request. Alternatively, the UE may send a PAAA Trigger Indicator described herein to indicate the need for PAAA with the request. Alternatively, the PAAA may be triggered by the SMF based on the policies or information received from the PCF/UDM.

Alternatively, the UE may send the application descriptor only, which may act as an indication to inform the SMF that the application indicated by the application descriptor needs to be authenticated and authorized to successfully establish PDU session. In this alternative, a UE may not include an application descriptor in a PDU session request if an application does not need to be authenticated and authorized, e.g., if the NSSA flag is Not Set.

In Step 4, when the SMF receives the PDU Session Establishment Request from the UE, it may identify based on the AA-message that the application requesting the PDU session needs a PAAA. The SMF may also obtain the application descriptor from the UE. Based on the request and other information received from the UE, the SMF may determine the AAA/DN-AAA server for PAAA. The SMF may send the PAAA request and application descriptor (if required) to the AAA/DN-AAA server. Alternatively, the SMF may trigger application authentication and authorization based on the PAAA Trigger Indicator. Alternatively, the PAAA SMF may trigger application authentication and authorization by the based on the policies or trigger information received from the PCF/UDM.

In Step 5, provided that the application is authenticated and authorized, the AAA/DN-AAA server may send back to the SMF a successful authentication and authorization message. This message may inform the SMF to Accept the PDU Session Request essentially authorizing the PDU session to be established. The successful authentication and authorization message may also include a list of IP Addresses, Port Numbers, and/or MAC Addresses (e.g., AFs), DNS names, etc. the PDU Session is authorized to send traffic using the application.

In Step 6, the SMF may send back to the UE a PDU Session Establishment Accept message.

If the AAA/DN-AAA server denies the SMF's PAAA request because the application could not be authenticated or authorized, then the PDU Session Establishment Request may be denied.

An alternative may be is to enforce the NSSA flag only for PDU sessions that are non-initial or secondary PDU sessions, that is for those PDU Session Establishment Request that does not have the "initial request" in the Request Type parameter. In other words, if the NSSA flag is Set for an S-NSSAI, the first PDU session from first application (e.g., App1) that is established over an S-NSSAI (e.g., S-NSSAI-X) may not require a PAAA. However, if a second (or later) application (e.g., App2, App3) starts and upon evaluating URSP, the UE may determine that the PDU session is to be established over an S-NSSAI (e.g., S-NSSAI-X) that already has an ongoing PDU session, and it is possible to use that existing PDU session. In such a case, the NSSA flag in the URSP may indicate to the UE to send an AA-message or PAAA Trigger Indicator and the App2 application descriptor to the core network for PAAA.

According to some aspects, network slices may be inaccessible to the UE in various scenarios. For example, when a mobile UE comes across a new geographical region (e.g., a PLMN, TA/RA, etc.), the UE's desired network slices may be unavailable in the new geographical region. Unavailable network slices may mean that the network slices were initially authorized (e.g., available via Allowed NSSAI) but are now unavailable in the new time or place because of restriction attributes, slices being unauthorized in particular TAs or, simply unavailable in a new geographical area or PLMN.

According to some aspects, the new TA/RA may cover specific dedicated frequency bands and hence, there may be network slices available or unavailable on those frequency bands. If the Requested NSSAI contain S-NSSAI(s) that are not available in the UE's new TA, the AMF itself or by interacting with the NSSF may determine a Target NSSAI to be used by the NG-RAN, to attempt to redirect the UE to a cell and TA in another frequency band and TA that supports the S-NSSAIs in the Target NSSAI (see TS 23.501), or the UE registration may be rejected because of empty Allowed NSSAI and the PDU sessions (e.g., if present in existing network slices) may be abandoned. On the other hand, the 5GS may try to remap the network slice with a suitable network slice (if available), so that the on-going PDU sessions may be gracefully transferred to a new remapped slice and 5GS may be able to provide service continuity and better user experience. According to some aspects, a remapped slice simply means a suitable slice where PLMN chooses to transfer PDU sessions from another slice.

According to some aspects, slice remapping may involve disassociation traffic (or a PDU Session) from a first slice and/or S-NSSAI and associating the traffic (or PDU Session) with a second slice and/or S-NSSAI. A network initiated remapping procedure may involve a network node (e.g., an AMF) determining to change the slice and/or S-NSSAI that is associated with a PDU Session of a UE and sending a notification message to the UE to notify the UE that the PDU Session that was associated with a first S-NSSAI is now associated with a second S-NSSAI. The notification may include the second S-NSSAI. A UE initiated remapping procedure may involve the UE determining to request that a PDU Session that is associated with a first S-NSSAI be disassociated form the first S-NSSAI and instead associated with a second S-NSSAI.

According to some aspects, the assumption is that the frequency bands/cells overlap in the TA and multiple TAs may be available to the UE. However, the network slices may also be unavailable to a UE based on time factor or due to permissions. Thus, a UE may also come across a situation such that there may be no authorized slice and the UE may attempt frequent cell search and drain its power too quickly. In another scenario, a UE may not be prepared for a sudden but temporary outage of frequency bands and hence the network slices and is unable to handle on-going PDU sessions. UE may come across several different scenarios. For example:

Network slices may be simply unavailable because there may not be any service available in the TA.

No authorized network slices may be available in the TAs for a UE. However, the UE may be able to access alternative slice with special privilege/permission and authorization.

No authorized network slices may be available in the TAs for a UE. However, network slices may be available in the neighboring TAs.

Network slices may not be available within a period of time but may be available shortly (e.g., at 1800 HRS).

This section describes how time and location information may be used to enhance 5GS such that a UE may prepare better to handle ongoing PDU sessions. Additionally, this section also describes how a UE may utilize time and location information for enhanced UE efficiency.

According to some aspects, the UE subscription information in the core network may contain network slices that UE is authorized to use, the service area restriction, RAT restrictions, forbidden area, and so on (e.g., Table 5.2.3.3.1-1 of TS 23.502). Furthermore, the AMF and/or NSSF may identify the frequency bands where one or more network slices are available or not available. In addition to this information, the UE and the core network may be able to utilize spatial and temporal information that may describe the availability of network slices in certain times and locations. The temporal and spatial information (TSI) are described supra, as well as how a UE and the network may be able to make use of TSI to work more efficiently.

According to some aspects, if a network slice is temporarily unavailable or if there is a time limitation for slice access for a UE, in other words, a network slice may be active only during a certain time period or if the network slice is not authorized to a UE for a defined period, that information may be configured in the core network with the UE subscription information and could be made available to the AMF or UDM and eventually to the UE.

On the other hand, the core network (e.g., UDM, NSSF, AMF or PCF) may have information on what network slices are available in the network or available in certain TAs and RAs. As discussed infra, the information may include whether UE may reside on certain cells and if the network slices are authorized for UE (e.g., deliverable in Allowed NSSAI) in certain frequency bands.

The aforementioned consolidated TSI may be utilized to inform the network and consequently inform the UE about upcoming network slice access availability. Depending upon the UE and its position/state, the upcoming availability may be temporal. In other words, the core network may determine when the UE could or could not access certain network slices ahead of time. For example, the UE may be within the home network or the UE may come across a VPLMN, and if an authorized network slice in the serving PLMN is active only within a specified period (e.g., after 6:00 PM and until 6:00 AM), this information could be utilized for the benefit of the UE.

Similarly, network slice's upcoming availability could be spatial. For instance, a UE (e.g., smartphone, a car with GPS, delivery drone UE, connected car, etc.) may be moving towards a certain direction. The GPS in the car may be set to follow a particular route. For such a car, the location services, the rate at which the UE is moving, and a predefined direction may give the core network a satisfactory probability by which the car may travel to a certain geographical location (e.g., TA/RA). Based on that information, the core network may be able to estimate the nature of traffic, the minimum, average and/or maximum bandwidth the UE may consume, which could be translated for the network to understand what services and network slices the UE requires. Given that the network has information on what slices the UE is authorized to access, the frequency bands the slices are available on and, TAs where the network slices may be available, two aspects could be pre-planned.

First, the network may be able to depict a topology of TAs. The topology information may include neighboring TAs where the UE is currently located, TAs where most network slices are authorized for the UE and the frequency bands network slices are available, list of neighboring TA covering certain radius, the distance between the TAs of interest (e.g., TAs where network slices are authorized), etc. There may be coverage gaps in the TAs, the TAs where no authorized network slices are available or are in slice-inaccessible (no-access) zone. Using this information, the network may be able to schedule an efficient frequency band redirection for a UE and, proactively redirect the UE to TAs and/or frequency bands where most relevant network slices are authorized. That way, the UE does not need to wait to request for network slices which would then trigger UE redirection to a proper frequency band.

Second, the information may be conveyed to the UE such that the UE utilizes it to determine expected neighboring TAs and hence, available network slices in the frequency bands of interest, which may give the UE an opportunity to change its direction and maintain a suitable speed if needed so that UE (e.g., drone, connected car, etc.) may decide to follow a path towards the TAs where the desired slices are available or TAs where there is a high probability of finding authorized network slices.

The temporal and spatial information about the slice availability, authorized S-NSSAIs, TA topology (including neighboring TAs), frequency band information, TA/RA id list, etc. may be sent to the UE during UE Configuration Update or using a NAS message when necessary. The delivery of this consolidated temporal and spatial information may be triggered by events such as Initial Registration, Mobility/Registration Update, UE Configuration Update, etc.

In addition to UE decisions to change direction or core network's decision to proactively redirect UE to proper frequency bands and/or TAs, the UE may be able to utilize TSI such that UE may interact with the active or to-be-active applications to reduce undesired operations and consequently reduce power consumption and help with UE efficiency.

If temporal information (e.g., Slice A is inactive between 6 AM and 6 PM) about a network slice in a TA is available to the UE, the UE may be able to pause/halt a to-be-established PDU session. For example, if an application task requires a significantly longer PDU session (e.g., gaming) and if the network slice's inactive-time period is approaching, the UE may decide to halt the start of that PDU session and inform the reason to the interested parties. This could mean that the UE may inform the UE application and/or disable the request originated from the UE application or, if the application has not started any PDU session, establish a Session Back-Off time during which the application cannot start a PDU session. UE may log a message for its decision and send it to the network or notify the user if necessary. Using such message, the UE may take an action to try another network slice (if available) or request another network slice if feasible.

Similarly, if the UE is mobile and based on the TA topology the network identifies coverage gaps in the TAs in the UE's path, but the TAs are relatively small such that the UE may pass through such TAs relatively quickly, then the UE may trigger an action to prepare for buffer UL data for applications whose access to slices will be unavailable. For example, the uplink data may be transmitted after a delay (e.g., starting based a trigger or temporal availability of a network slice) so that an application will have access to slice. The delay may be based on a timing of the availability of the slice, e.g., when an unavailable slice will become available. Similarly, core network (AMF or SMF) may trigger participating UPF to buffer the DL data (for SSC mode 1). The UE may be informed about the TA topology as discussed herein, so that the UE may take actions to reduce operations and save UE from draining power.

If there is no authorized network slice available in the TA or no authorized network slice available in the TA for pre-defined period, the UE could take one or more of the following actions. For example:

The UE may to reduce attempts for cell search (e.g., reduce cell search by 80%).

The UE may save the state (e.g., idle, connected, active, inactive, etc.) of the application. For instance, the UE application may have been waiting for a response from the network. Such state could be saved and later picked up if the authorized slice came on-line.

The UE may save the state (e.g., idle, connected, active, inactive, etc.) of PDU sessions and buffer any UL data appropriately. For example, the PDU session may be in an idle state or a connected state.

The UE may save any background data state and/or delay data transfer.

UE may disable notifications from the active applications in the UE and/or disable push notifications.

UE may turn off Non-3GPP access type commands and stop search for N3IWF access points.

The UE may prepare for slice remapping if the PLMN supports slice remapping.

The UE may turn off broadcast type activities.

The UE may reduce time to reach sleep state or make the UE sleep immediately.

The UE may start a Still-Timer that would allow the UE to conduct all the aforementioned actions for a specific amount of time (e.g., actions such as buffering the UL data may be prevented from continuing indefinitely). If unavailability of network slices continues to sustain beyond Still-Timer, the UE may kill the application processes completely and flush any incomplete UL data and state of the applications. On the other side, the SMF may start a different Still-Timer as soon as the UE enters the TA where authorized slices are unavailable.

If the UE determines based on consolidated spatial and temporal information that no authorized slice will be available via 3GPP access type but are accessible via non-3GPP access types, then UE may trigger a path switch and off-load application traffic towards the non-3gpp access type.

The UE capability by which the UE may receive consolidated TSI, may use the consolidated TSI to interact with the UE application and based on the TSI, may steer the UE where network slices are available such that the overall UE efficiency is enhanced may be referred to as UE Application Interaction and Steering Capability (AISC).

According to some aspects, the UE AISC may need to be informed to the network with an AISC indicator. Alternatively, the UE may send a UE release or version number/identifier to the network which may help the network determine whether the UE is capable of receiving and using TSI. The TSI may be conveyed to the UE simply during a UE Registration or UE Registration Update procedure after a successful UE registration, as described in FIG. 11.

In Step 1, the UE may send a Registration Request or a Registration Update Request to the core network (AMF) via RAN. In the request, the UE may send an AISC indicator to the network. Alternatively, this indication may also be conveyed implicitly by sending the UE release number/identifier (e.g., 3GPP Rel-18, 5G Advanced, etc.) such that upon identifying such capability, the network may send the TSI to the UE. The application interaction capability may mean that the UE is designed to understand, analyze and/or utilize TSI received from the network that may improve the overall efficiency of the UE.

In Step 2, the UE registration procedure may continue (e.g., as described in Steps 4 to Step 18 of a figure of TS 23.502 [2] that is identified in that document as 4.2.2.2.2-1). If the AMF does not have subscription data for the UE, the AMF may retrieve the Access and Mobility Subscription data, SMF Selection Subscription data using Nudm_SDM_Get.

In Step 3, upon a successful UE registration, the core network (AMF) may send a UE Registration Accept message to the UE via RAN. The network may include UE Spatial and Temporal information in the Registration Accept message.

Conveying TSI to the UE Using UE Configuration Update Procedure

According to some aspects, the TSI may be alternatively conveyed to the UE using UE Configuration Update procedure. In the case when there are new TSI available, the network may trigger UE configuration update procedure. According to some aspects, the method by which TSI may be conveyed during a UE Configuration Update procedure is described in FIG. 12.

This procedure may be initiated by the AMF when the AMF wants to update access and mobility management related parameters in the UE configuration.

This procedure may also be used to trigger the UE to perform, based on network indication, either Mobility Registration Update procedure while the UE is in CM-CONNECTED state to modify NAS parameters that require negotiation (e.g., MICO mode) or to steer the UE towards EPC (e.g., as specified in clause 5.31.3 of TS 23.501 [1]), or Mobility Registration Update procedure after the UE enters CM-IDLE state (e.g., for changes to Allowed NSSAI that require re-registration). If a Registration procedure is needed, the AMF may provide an indication to the UE to initiate a Registration procedure.

UE Configuration Update may be sent over the Access Type (e.g., 3GPP access or non-3GPP access) the UE Configuration Update is applied to, when applicable. The AMF may request for a UE acknowledgement after NAS parameters that includes temporal and spatial information update is to the UE.

Figures 12, 13:
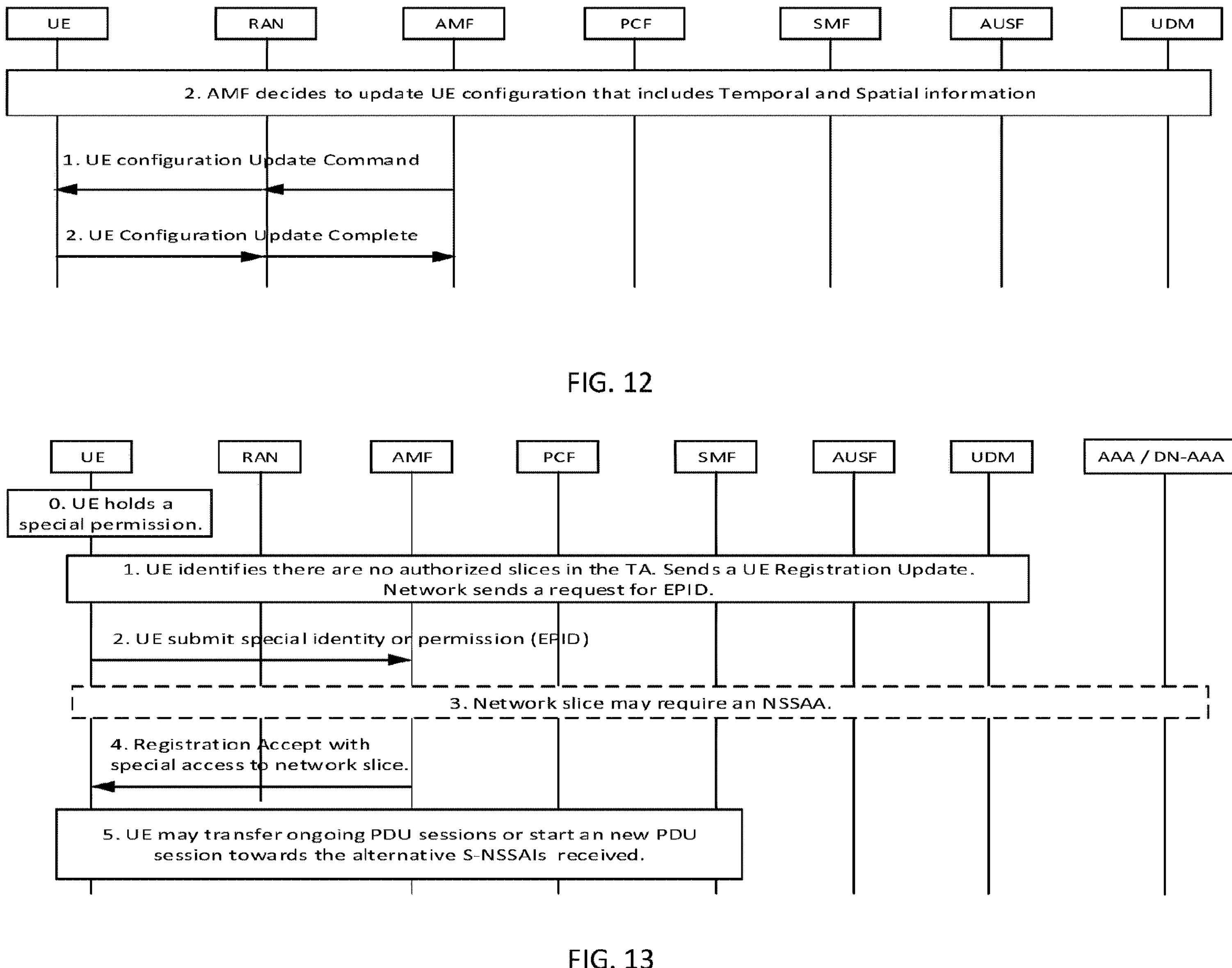
FIG. 12 shows an example UE configuration update procedure to convey spatial and temporal information to the UE.
FIG. 13 shows an example of method for accessing alternative network slices with special authorization.

According to some aspects, a UE Configuration Update procedure to convey spatial and temporal information to the UE is shown in FIG. 12.

In Step 0, AMF may determine the necessity of UE configuration change due to various reasons (e.g., UE mobility change, NW policy, reception of Subscriber Data Update Notification from UDM, change of Network Slice configuration, change of Enhanced Coverage Restriction information in the UE context) or that the UE needs to perform a Registration Procedure. The reason may include a need for network to inform about the (updated) temporal and spatial information (TSI) to the UE.

In Step 1, the AMF sends and enhanced UE Configuration Update Command containing one or more UE parameters including TSI. The TSI may include an enhanced TAI list that comprise of TA topology and/or gap TAs and the authorization time, etc. as discussed herein.

In Step 2, if the UE Configuration Update Indication requires acknowledgement of the UE Configuration Update Command, the UE may send a UE Configuration Update complete message to the AMF.

Alternatively, the core network (AMF) may convey the TSI to the UE using a NAS message.

According to some aspects, an MNO/PLMN may have geographical areas where it may allow only those UEs that have special permissions. MNO may set network slices for special access for sensitivity or resource availability reasons. The gap TAs (slice inaccessible zones) may offer network slices only for special services (e.g., military communication) with special permission and authorization. According to some aspects, FIG. 13 describes how a UE may be able to submit a special permission/privilege and receive alternative network slices from the network.

This section describes how a UE may send a set of credentials and/or an identity to the network so that the network may determine to add slices to the UE's Configured NSSAI. According to some aspects, this may be useful in a scenario where the UE enters a TA/RA where the UE has no slices in its Configured NSSAI that are accessible in the TA/RA. The procedure described infra may allow the user to enter an identity and/or set of credentials that may be sent to the network in order for the Configured NSSAI to be updated with slices that are accessible in the current RA/TA.

In Step 0, UE may have received an Elevated Privilege Identity (EPID), which is a separate unique identity for special privilege/permission. The EPID may represent elevated permission for the UE. For example, the UE may be a designated UE with highest privilege for top ranking military officer or a diplomat, or the UE may have a special subscription for elevated privilege which is triggered only when a scenario categorized as "special" is encountered. A "special" scenario may be a case when no slices are authorized in some geographical regions.

In Step 1, when the UE enters into new geographical region (TA/RA) and undergoes a registration update, it may identify that there are no authorized network slices available in the TA. The UE may further identify that there are no overlapping TAs where any authorized slices are available. The AMF may send a request to the UE asking if the UE has an elevated privilege and if positive, asking to send an EPID.

Alternatively, the UE and the network may identify ahead of time from the TA topology information (consolidated TSI) discussed herein that there are no authorized network slices available in a TAs/RAs covering certain geographical region (which may include TA list covering neighboring TAs). Based on UE subscription information, the network may also determine that the UE bears an elevated privilege, and hence, the AMF may send a request for EPID to the UE and asking if the UE is willing to use the privilege.

Alternatively, the network may send back to the UE a set of alternative S-NSSAIs when asking for EPID to the UE.

In Step 2, the UE may send its EPID to the UE using NAS message. Upon receiving the EPID, the core network (AMF, AUSF, and/or UDM) may verify such an identifier. If the EPID is not valid/expired or isn't authentic, the AMF may send back an NAS message indicating that the UE is denied from accessing any network slice with a cause code.

In Step 3, the UE may need to go through NSSAA procedure. Here, the EAP ID may be enhanced to include the EPID. In this case, UE may be authenticated and authorized by an AAA or a third-party AAA server. During the authorization procedure, the AAA-S may verify the EPID for authorization of network slice.

In Step 4, the AMF may send to the UE a set of alternative S-NSSAI that the UE may access using EPID in the Allowed NSSAI with Registration Accept message.

In Step 5, the UE may request to core network (AMF or SMF) to transfer any ongoing PDU sessions towards the alternative S-NSSAIs or request to establish new PDU sessions towards alternative S-NSSAI.

Figure 14:
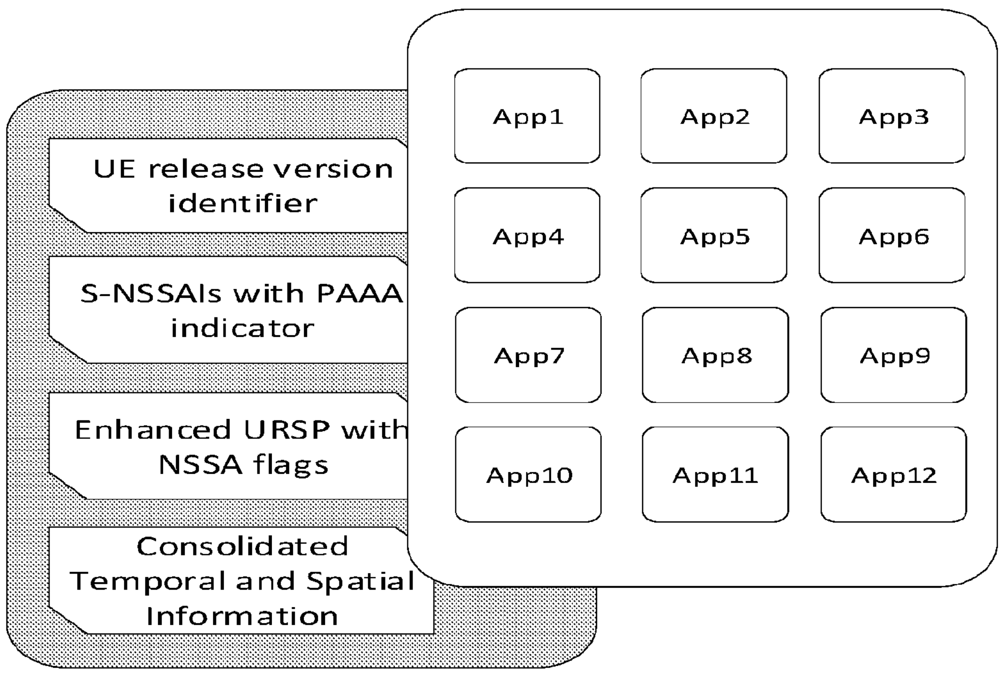
FIG. 14 shows an example UE UI showing installed applications and various enhanced features.

According to some aspects, FIG. 14 shows front and back user interfaces of a UE (e.g., smartphone). The front portion shows many applications installed in the UE suggesting that there may be applications from different vendors. The back user interface shows features of an enhanced UE. In particular, the UE is equipped with UE release version identifier, S-NSSAIs with PAAA indicators, enhanced URSP with NSSA flags, and consolidated temporal and spatial information received from the core network.

According to some aspects, an application may present a GUI that allows the user to enter an Application Instance identity and/or a set of credentials that are associated with the Application Instance. The Application Instance identity and/or a set of credentials may then be used by the UE in the PAAA procedure that is described above.

The 3rd Generation Partnership Project (3GPP) develops technical standards for cellular telecommunications network technologies, including radio access, the core transport network, and service capabilities-including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHZ, and the provision of new ultra-mobile broadband radio access above 7 GHz. The flexible radio access is expected to consist of a new, non-backwards compatible radio access in new spectrum below 7 GHz, and it is expected to include different operating modes that may be multiplexed together in the same spectrum to address a broad set of 3GPP NR use cases with diverging requirements. The ultra-mobile broadband is expected to include cm Wave and mmWave spectrum that may provide the opportunity for ultra-mobile broadband access for, e.g., indoor applications and hotspots. In particular, the ultra-mobile broadband is expected to share a common design framework with the flexible radio access below 7 GHZ, with cmWave and mm Wave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

Figure 15A:
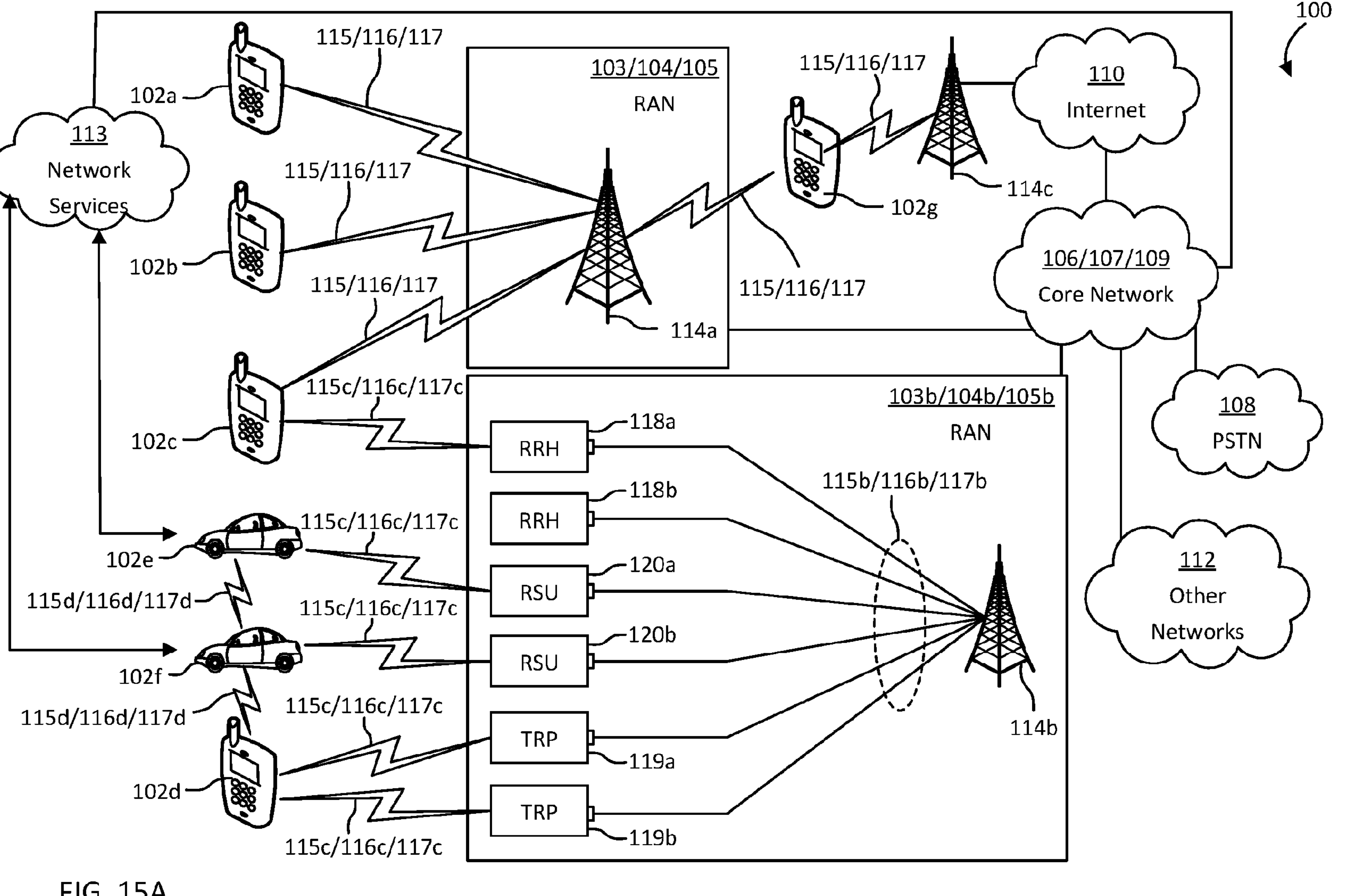
FIG. 15A shows an example communications system.

FIG. 15A illustrates an example communications system 100 in which the systems, methods, and apparatuses described and claimed herein may be used. The communications system 100 may include wireless transmit/receive units (WTRUs) 102*a*, 102*b*, 102*c*, 102*d*, 102*e*, 102*f*, and/or 102*g*, which generally or collectively may be referred to as WTRU 102 or WTRUs 102. The communications system 100 may include, a radio access network (RAN) 103/104/105/103*b*/104*b*/105*b*, a core network 106/107/109, a public switched telephone network (PSTN) 108, the Internet 110, other networks 112, and Network Services 113. 113. Network Services 113 may include, for example, a V2X server, V2X functions, a ProSe server, ProSe functions, IoT services, video streaming, and/or edge computing, etc.

It may be appreciated that the concepts disclosed herein may be used with any number of WTRUs, base stations, networks, and/or network elements. Each of the WTRUs 102 may be any type of apparatus or device configured to operate and/or communicate in a wireless environment. In the example of FIG. 15A, each of the WTRUs 102 is depicted in FIGS. 8A-8E as a hand-held wireless communications apparatus. It is understood that with the wide variety of use cases contemplated for wireless communications, each WTRU may comprise or be included in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus or truck, a train, or an airplane, and the like.

The communications system 100 may also include a base station 114*a* and a base station 114*b*. In the example of FIG. 15A, each base stations 114*a* and 114*b* is depicted as a single element. In practice, the base stations 114*a* and 114*b* may include any number of interconnected base stations and/or network elements. Base stations 114*a* may be any type of device configured to wirelessly interface with at least one of the WTRUs 102*a*, 102*b*, and 102*c* to facilitate access to one or more communication networks, such as the core network 106/107/109, the Internet 110, Network Services 113, and/or the other networks 112. Similarly, base station 114*b* may be any type of device configured to wiredly and/or wirelessly interface with at least one of the Remote Radio Heads (RRHs) 118*a*, 118*b*, Transmission and Reception Points (TRPs) 1115A, 1115B, and/or Roadside Units (RSUs) 120*a* and 120*b* to facilitate access to one or more communication networks, such as the core network 106/107/109, the Internet 110, other networks 112, and/or Network Services 113. RRHs 118*a*, 118*b* may be any type of device configured to wirelessly interface with at least one of the WTRUs 102, e.g., WTRU 102*c*, to facilitate access to one or more communication networks, such as the core network 106/107/109, the Internet 110, Network Services 113, and/or other networks 112.

TRPs 1115A, 1115B may be any type of device configured to wirelessly interface with at least one of the WTRU 102*d*, to facilitate access to one or more communication networks, such as the core network 106/107/109, the Internet 110, Network Services 113, and/or other networks 112. RSUs 120*a* and 120*b* may be any type of device configured to wirelessly interface with at least one of the WTRU 102*e* or 102*f*, to facilitate access to one or more communication networks, such as the core network 106/107/109, the Internet 110, other networks 112, and/or Network Services 113. By way of example, the base stations 114*a*, 114*b* may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114*a* may be part of the RAN 103/104/105, which may also include other base stations and/or network elements (not shown), such as a Base Station Controller (BSC), a Radio Network Controller (RNC), relay nodes, etc. Similarly, the base station 114*b* may be part of the RAN 103*b*/104*b*/105*b*, which may also include other base stations and/or network elements (not shown), such as a BSC, a RNC, relay nodes, etc. The base station 114*a* may be configured to transmit and/or receive wireless signals within a particular geographic region, which may be referred to as a cell (not shown). Similarly, the base station 114*b* may be configured to transmit and/or receive wired and/or wireless signals within a particular geographic region, which may be referred to as a cell (not shown). The cell may further be divided into cell sectors. For example, the cell associated with the base station 114*a* may be divided into three sectors. Thus, for example, the base station 114*a* may include three transceivers, e.g., one for each sector of the cell. The base station 114*a* may employ Multiple-Input Multiple Output (MIMO) technology and, therefore, may utilize multiple transceivers for each sector of the cell, for instance.

The base station 114*a* may communicate with one or more of the WTRUs 102*a*, 102*b*, 102*c*, and 102*g* over an air interface 115/116/117, which may be any suitable wireless communication link (e.g., Radio Frequency (RF), microwave, infrared (IR), ultraviolet (UV), visible light, cmWave, mmWave, etc.). The air interface 115/116/117 may be established using any suitable Radio Access Technology (RAT).

The base station 114*b* may communicate with one or more of the RRHs 118*a* and 118*b*, TRPs 1115A and 1115B, and/or RSUs 120*a* and 120*b*, over a wired or air interface 115*b*/116*b*/117*b*, which may be any suitable wired (e.g., cable, optical fiber, etc.) or wireless communication link (e.g., RF, microwave, IR, UV, visible light, cmWave, mmWave, etc.). The air interface 115*b*/116*b*/117*b* may be established using any suitable RAT.

The RRHs 118*a*, 118*b*, TRPs 1115A, 1115B and/or RSUs 120*a*, 120*b*, may communicate with one or more of the WTRUs 102*c*, 102*d*, 102*e*, 102*f* over an air interface 115*c*/116*c*/117*c*, which may be any suitable wireless communication link (e.g., RF, microwave, IR, ultraviolet UV, visible light, cmWave, mmWave, etc.) The air interface 115*c*/116*c*/117*c* may be established using any suitable RAT.

The WTRUs 102 may communicate with one another over a direct air interface 115*d*/116*d*/117*d*, such as Sidelink communication which may be any suitable wireless communication link (e.g., RF, microwave, IR, ultraviolet UV, visible light, cmWave, mmWave, etc.) The air interface 115_d_/116_d_/117_d_ may be established using any suitable RAT.

The communications system 100 may be a multiple access system and may employ one or more channel access schemes, such as CDMA, TDMA, FDMA, OFDMA, SC-FDMA, and the like. For example, the base station 114_a_ in the RAN 103/104/105 and the WTRUs 102_a_, 102_b_, 102_c_, or RRHs 118_a_, 118_b_, TRPs 1115A, 1115B and/or RSUs 120_a_ and 120_b_ in the RAN 103_b_/104_b_/105_b_ and the WTRUs 102_c_, 102_d_, 102_e_, and 102_f_, may implement a radio technology such as Universal Mobile Telecommunications System (UMTS) Terrestrial Radio Access (UTRA), which may establish the air interface 115/116/117 and/or 115_c_/116_c_/117_c_ respectively using Wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

The base station 114_a_ in the RAN 103/104/105 and the WTRUs 102_a_, 102_b_, 102_c_, and 102_g_, or RRHs 118_a_ and 118_b_, TRPs 1115A and 1115B, and/or RSUs 120_a_ and 120_b_ in the RAN 103_b_/104_b_/105_b_ and the WTRUs 102_c_, 102_d_, may implement a radio technology such as Evolved UMTS Terrestrial Radio Access (E-UTRA), which may establish the air interface 115/116/117 or 115_c_/116_c_/117_c_ respectively using Long Term Evolution (LTE) and/or LTE-Advanced (LTE-A), for example. The air interface 115/116/117 or 115_c_/116_c_/117_c_ may implement 3GPP NR technology. The LTE and LTE-A technology may include LTE D2D and/or V2X technologies and interfaces (such as Sidelink communications, etc.) Similarly, the 3GPP NR technology may include NR V2X technologies and interfaces (such as Sidelink communications, etc.)

The base station 114_a_ in the RAN 103/104/105 and the WTRUs 102_a_, 102_b_, 102_c_, and 102_g_ or RRHs 118_a_ and 118_b_, TRPs 1115A and 1115B, and/or RSUs 120_a_ and 120_b_ in the RAN 103_b_/104_b_/105_b_ and the WTRUs 102_c_, 102_d_, 102_e_, and 102_f_ may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114_c_ in FIG. 15A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like. The base station 114_c_ and the WTRUs 102, e.g., WTRU 102_e_, may implement a radio technology such as IEEE 802.11 to establish a Wireless Local Area Network (WLAN). Similarly, the base station 114_c_ and the WTRUs 102, e.g., WTRU 102_d_, may implement a radio technology such as IEEE 802.15 to establish a wireless personal area network (WPAN). The base station 114_c_ and the WTRUs 102, e.g., WRTU 102_e_, may utilize a cellular-based RAT (e.g., WCDMA, CDMA2000, GSM, LTE, LTE-A, NR, etc.) to establish a picocell or femtocell. As shown in FIG. 15A, the base station 114_c_ may have a direct connection to the Internet 110. Thus, the base station 114_c_ may not be required to access the Internet 110 via the core network 106/107/109.

The RAN 103/104/105 and/or RAN 103_b_/104_b_/105_b_ may be in communication with the core network 106/107/109, which may be any type of network configured to provide voice, data, messaging, authorization and authentication, applications, and/or Voice Over Internet Protocol (VOIP) services to one or more of the WTRUs 102. For example, the core network 106/107/109 may provide call control, billing services, mobile location-based services, pre-paid calling, Internet connectivity, packet data network connectivity, Ethernet connectivity, video distribution, etc., and/or perform high-level security functions, such as user authentication.

Although not shown in FIG. 15A, it may be appreciated that the RAN 103/104/105 and/or RAN 103_b_/104_b_/105_b_ and/or the core network 106/107/109 may be in direct or indirect communication with other RANs that employ the same RAT as the RAN 103/104/105 and/or RAN 103_b_/104_b_/105_b_ or a different RAT. For example, in addition to being connected to the RAN 103/104/105 and/or RAN 103_b_/104_b_/105_b_, which may be utilizing an E-UTRA radio technology, the core network 106/107/109 may also be in communication with another RAN (not shown) employing a GSM or NR radio technology.

The core network 106/107/109 may also serve as a gateway for the WTRUS 102 to access the PSTN 108, the Internet 110, and/or other networks 112. The PSTN 108 may include circuit-switched telephone networks that provide Plain Old Telephone Service (POTS). The Internet 110 may include a global system of interconnected computer networks and devices that use common communication protocols, such as the Transmission Control Protocol (TCP), User Datagram Protocol (UDP), and the internet protocol (IP) in the TCP/IP internet protocol suite. The other networks 112 may include wired or wireless communications networks owned and/or operated by other service providers. For example, the networks 112 may include any type of packet data network (e.g., an IEEE 802.3 Ethernet network) or another core network connected to one or more RANs, which may employ the same RAT as the RAN 103/104/105 and/or RAN 103_b_/104_b_/105_b_ or a different RAT.

Some or all of the WTRUs 102_a_, 102_b_, 102_c_, 102_d_, 102_e_, and 102_f_ in the communications system 100 may include multi-mode capabilities, e.g., the WTRUs 102_a_, 102_b_, 102_c_, 102_d_, 102_e_, and 102_f_ may include multiple transceivers for communicating with different wireless networks over different wireless links. For example, the WTRU 102_g_ shown in FIG. 15A may be configured to communicate with the base station 114_a_, which may employ a cellular-based radio technology, and with the base station 114_c_, which may employ an IEEE 802 radio technology.

Although not shown in FIG. 15A, it may be appreciated that a User Equipment may make a wired connection to a gateway. The gateway may be a Residential Gateway (RG). The RG may provide connectivity to a Core Network 106/107/109. It may be appreciated that many of the ideas contained herein may equally apply to UEs that are WTRUs and UEs that use a wired connection to connect to a network. For example, the ideas that apply to the wireless interfaces 115, 116, 117 and 115_c_/116_c_/117_c_ may equally apply to a wired connection.

Figure 15B:
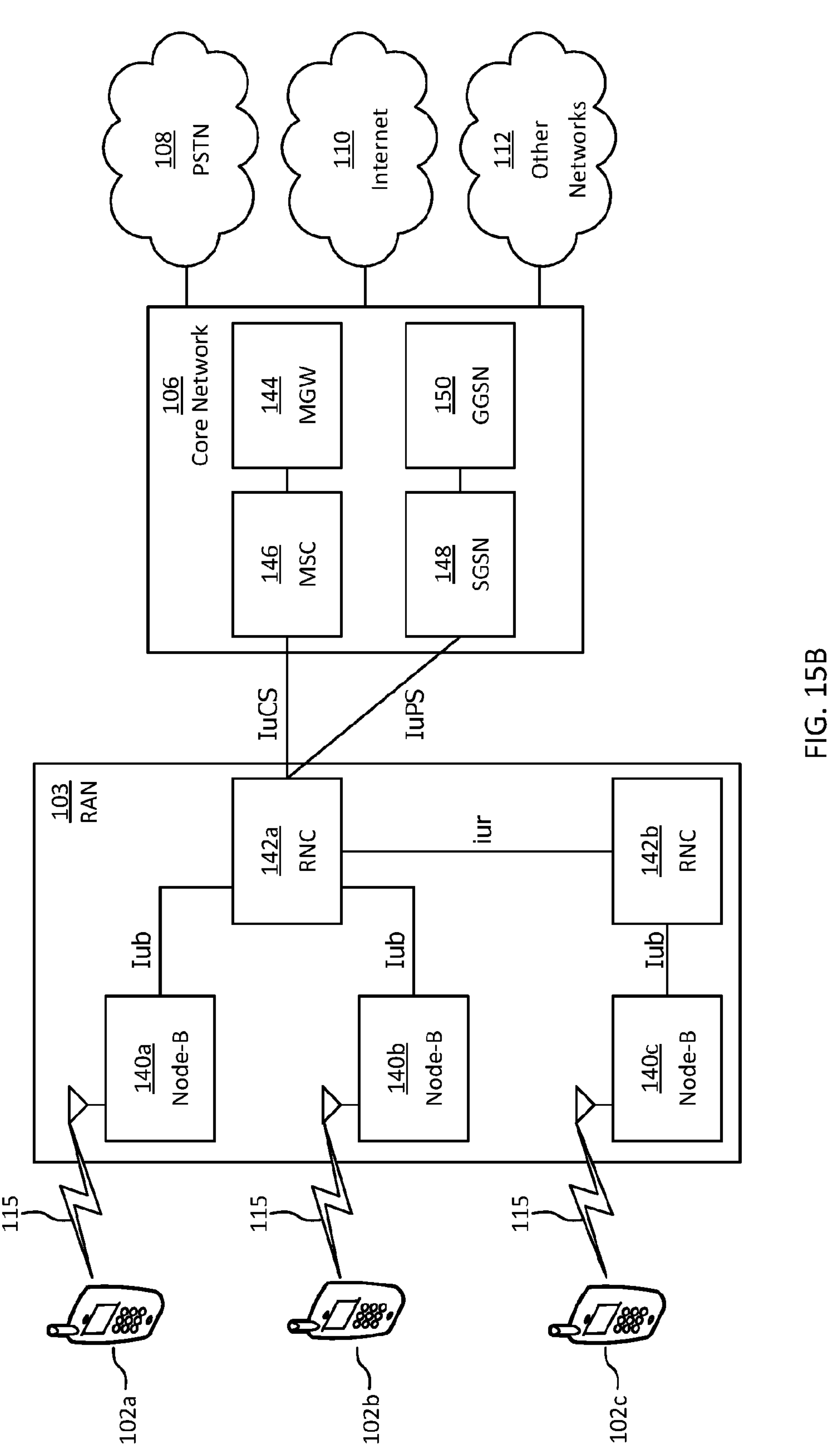
FIGS. 15B, 15C, and 15D show system diagrams of example RANs and core networks.

FIG. 15B is a system diagram of an example RAN 103 and core network 106. As noted above, the RAN 103 may employ a UTRA radio technology to communicate with the WTRUs 102_a_, 102_b_, and 102_c_ over the air interface 115. The RAN 103 may also be in communication with the core network 106. As shown in FIG. 15B, the RAN 103 may include Node-Bs 140_a_, 140_b_, and 140_c_, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It may be appreciated that the RAN 103 may include any number of Node-Bs and Radio Network Controllers (RNCs.)

As shown in FIG. 15B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 15B may include a media gateway (MGW) 144, a Mobile Switching Center (MSC) 146, a Serving GPRS Support Node (SGSN) 148, and/or a Gateway GPRS Support Node (GGSN) 150. While each of the foregoing elements are depicted as part of the core network 106, it may be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned and/or operated by other service providers.

Figure 15C:
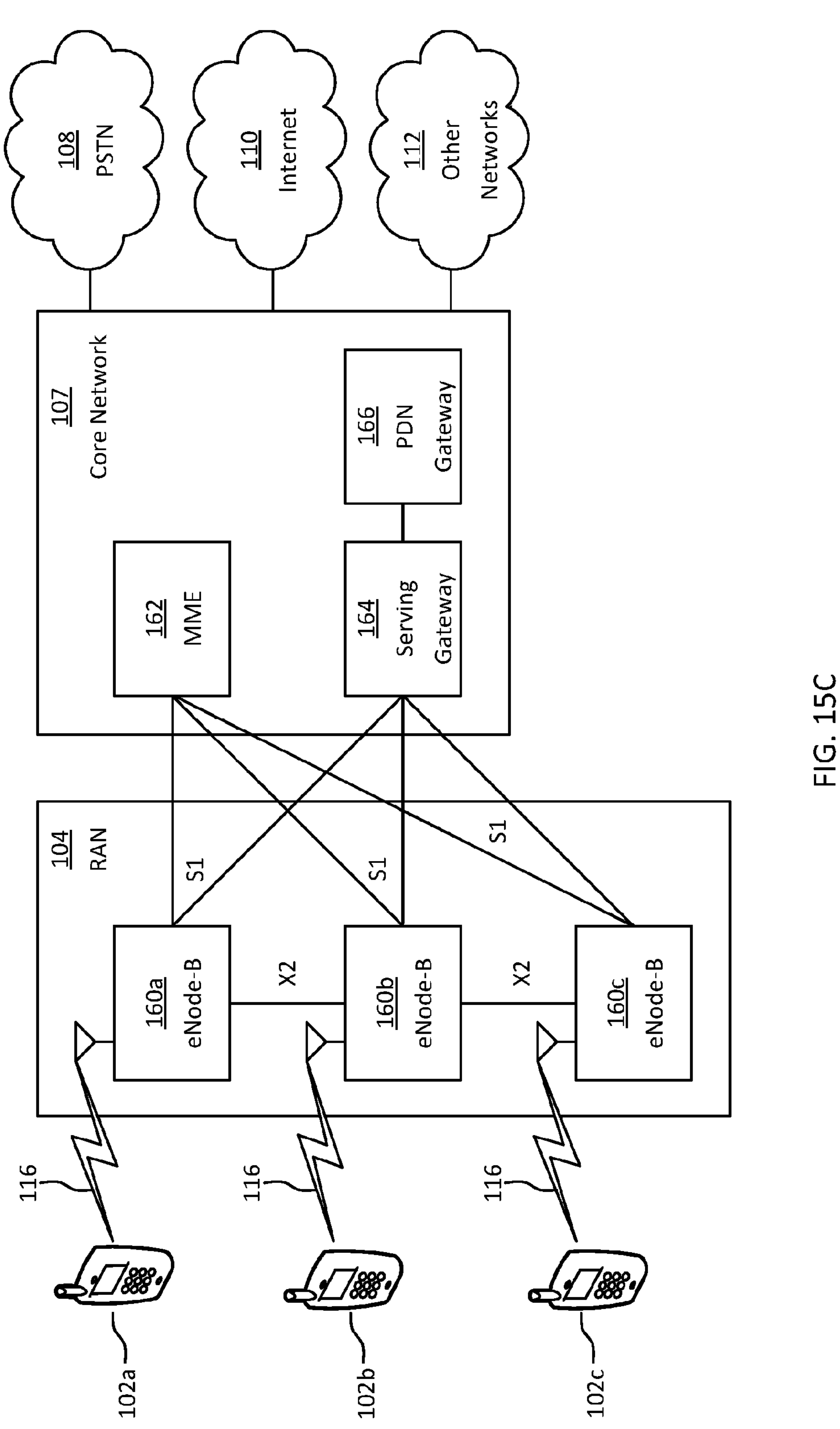

FIG. 15C is a system diagram of an example RAN 104 and core network 107. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it may be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 15C, the eNode-Bs 160a, 160b, and 160c may communicate with one another over an X2 interface.

The core network 107 shown in FIG. 15C may include a Mobility Management Gateway (MME) 162, a serving gateway 164, and a Packet Data Network (PDN) gateway 166. While each of the foregoing elements are depicted as part of the core network 107, it may be appreciated that any one of these elements may be owned and/or operated by an entity other than the core network operator.

The MME 162 may be connected to each of the eNode-Bs 160a, 160b, and 160c in the RAN 104 via an SI interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the SI interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned and/or operated by other service providers.

Figure 15D:
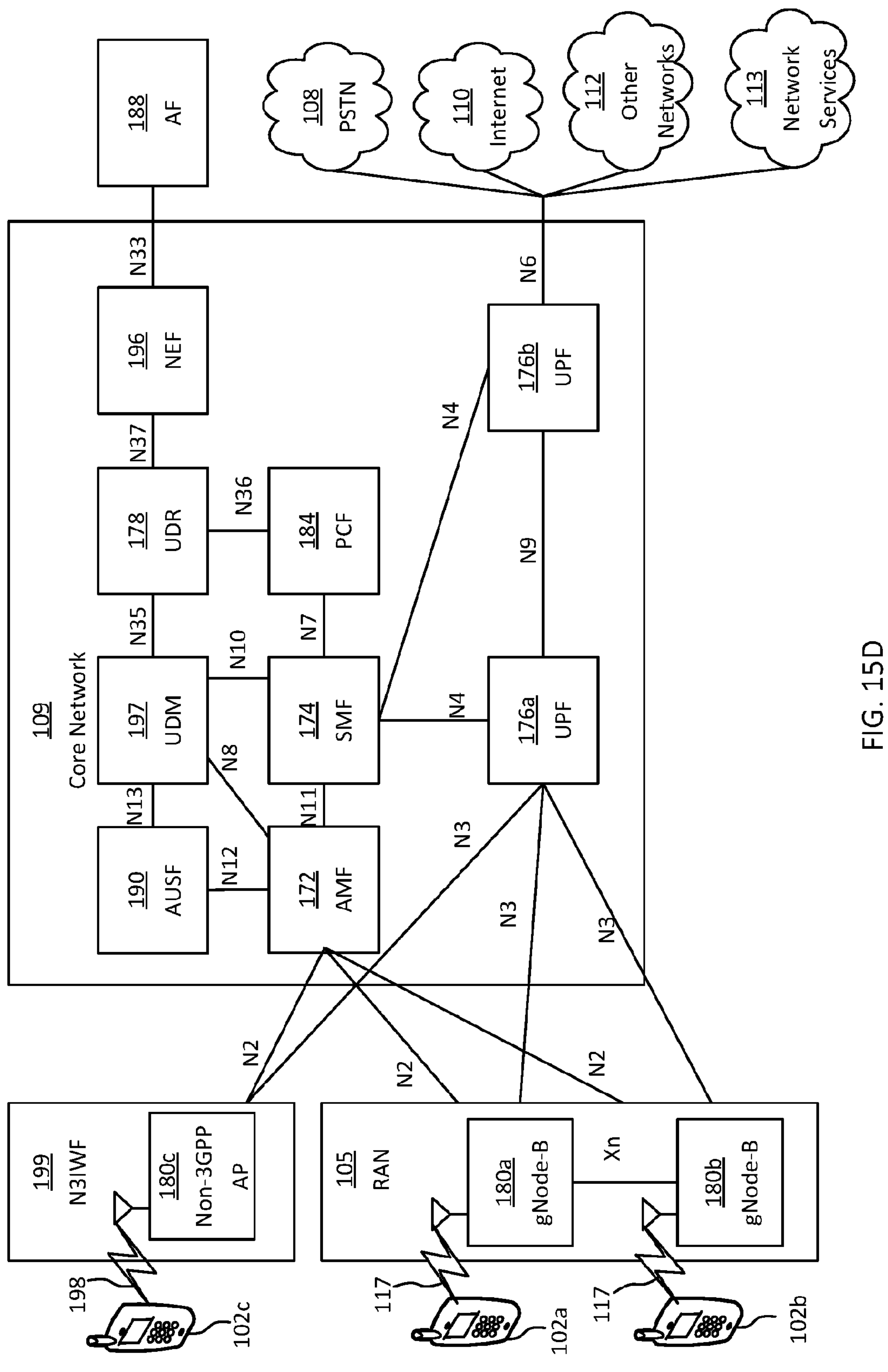

FIG. 15D is a system diagram of an example RAN 105 and core network 109. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It may be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180*a* and 180*b* may implement MIMO, MU-MIMO, and/or digital beamforming technology. Thus, the gNode-B 180*a*, for example, may use multiple antennas to transmit wireless signals to, and receive wireless signals from, the WTRU 102*a*. It should be appreciated that the RAN 105 may employ of other types of base stations such as an eNode-B. It may also be appreciated the RAN 105 may employ more than one type of base station. For example, the RAN may employ eNode-Bs and gNode-Bs.

The N3IWF 199 may include a non-3GPP Access Point 180*c*. It may be appreciated that the N3IWF 199 may include any number of non-3GPP Access Points. The non-3GPP Access Point 180*c* may include one or more transceivers for communicating with the WTRUs 102*c* over the air interface 198. The non-3GPP Access Point 180*c* may use the 802.11 protocol to communicate with the WTRU 102*c* over the air interface 198.

Each of the gNode-Bs 180*a* and 180*b* may be associated with a particular cell (not shown) and may be configured to handle radio resource management decisions, handover decisions, scheduling of users in the uplink and/or downlink, and the like. As shown in FIG. 15D, the gNode-Bs 180*a* and 180*b* may communicate with one another over an Xn interface, for example.

The core network 109 shown in FIG. 15D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless and/or network communications or a computer system, such as system 90 illustrated in FIG. 15G.

In the example of FIG. 15D, the 5G Core Network 109 may include an access and mobility management function (AMF) 172, a Session Management Function (SMF) 174, User Plane Functions (UPFs) 176*a* and 176*b*, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it may be appreciated that any one of these elements may be owned and/or operated by an entity other than the core network operator. It may also be appreciated that a 5G core network may not consist of all of these elements, may consist of additional elements, and may consist of multiple instances of each of these elements. FIG. 15D shows that network functions directly connect to one another, however, it should be appreciated that they may communicate via routing agents such as a diameter routing agent or message buses.

In the example of FIG. 15D, connectivity between network functions is achieved via a set of interfaces, or reference points. It may be appreciated that network functions may be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102*a*, 102*b*, and 102*c* via an N1 interface. The N1 interface is not shown in FIG. 15D.

The SMF 174 may be connected to the AMF 172 via an N11 interface. Similarly the SMF may be connected to the PCF 184 via an N7 interface, and to the UPFs 176*a* and 176*b* via an N4 interface. The SMF 174 may serve as a control node. For example, the SMF 174 may be responsible for Session Management, IP address allocation for the WTRUs 102*a*, 102*b*, and 102*c*, management and configuration of traffic steering rules in the UPF 176*a* and UPF 176*b*, and generation of downlink data notifications to the AMF 172.

The UPF 176*a* and UPF 176*b* may provide the WTRUs 102*a*, 102*b*, and 102*c* with access to a Packet Data Network (PDN), such as the Internet 110, to facilitate communications between the WTRUs 102*a*, 102*b*, and 102*c* and other devices. The UPF 176*a* and UPF 176*b* may also provide the WTRUs 102*a*, 102*b*, and 102*c* with access to other types of packet data networks. For example, Other Networks 112 may be Ethernet Networks or any type of network that exchanges packets of data. The UPF 176*a* and UPF 176*b* may receive traffic steering rules from the SMF 174 via the N4 interface. The UPF 176*a* and UPF 176*b* may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102*c* and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 15D. The PCF 184 may provide policy rules to control plane nodes such as the AMF 172 and SMF 174, allowing the control plane nodes to enforce these rules. The PCF 184, may send policies to the AMF 172 for the WTRUs 102*a*, 102*b*, and 102*c* so that the AMF may deliver the policies to the WTRUs 102*a*, 102*b*, and 102*c* via an N1 interface. Policies may then be enforced, or applied, at the WTRUs 102*a*, 102*b*, and 102*c*.

The UDR 178 may act as a repository for authentication credentials and subscription information. The UDR may connect to network functions, so that network function may add to, read from, and modify the data that is in the repository. For example, the UDR 178 may connect to the PCF 184 via an N36 interface. Similarly, the UDR 178 may connect to the NEF 196 via an N37 interface, and the UDR 178 may connect to the UDM 197 via an N35 interface.

The UDM 197 may serve as an interface between the UDR 178 and other network functions. The UDM 197 may authorize network functions to access of the UDR 178. For example, the UDM 197 may connect to the AMF 172 via an N8 interface, the UDM 197 may connect to the SMF 174 via an N10 interface. Similarly, the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect to an AF 188 via an N33 interface and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that may be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g., in the areas of functionality, performance and isolation.

3GPP has designed the 5G core network to support Network Slicing. Network Slicing is a good tool that network operators may use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 15D, in a network slicing scenario, a WTRU 102*a*, 102*b*, or 102*c* may connect to an AMF 172, via an N1 interface. The AMF may be logically part of one or more slices. The AMF may coordinate the connection or communication of WTRU 102*a*, 102*b*, or 102*c* with one or more UPF 176*a* and 176*b*, SMF 174, and other network functions. Each of the UPFs 176*a* and 176*b*, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102*a*, 102*b*, and 102*c* and servers or applications functions 188. In addition, the core network 170 may provide the WTRUs 102*a*, 102*b*, and 102*c* with access to the networks 112, which may include other wired or wireless networks that are owned and/or operated by other service providers.

The core network entities described herein and illustrated in FIGS. 8A, 8C, 8D, and 8E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 8A, 8B, 8C, 8D, and 8E are provided by way of example only, and it is understood that the subject matter disclosed and claimed herein may be embodied or implemented in any similar communication system, whether presently defined or defined in the future.

Figure 15E:
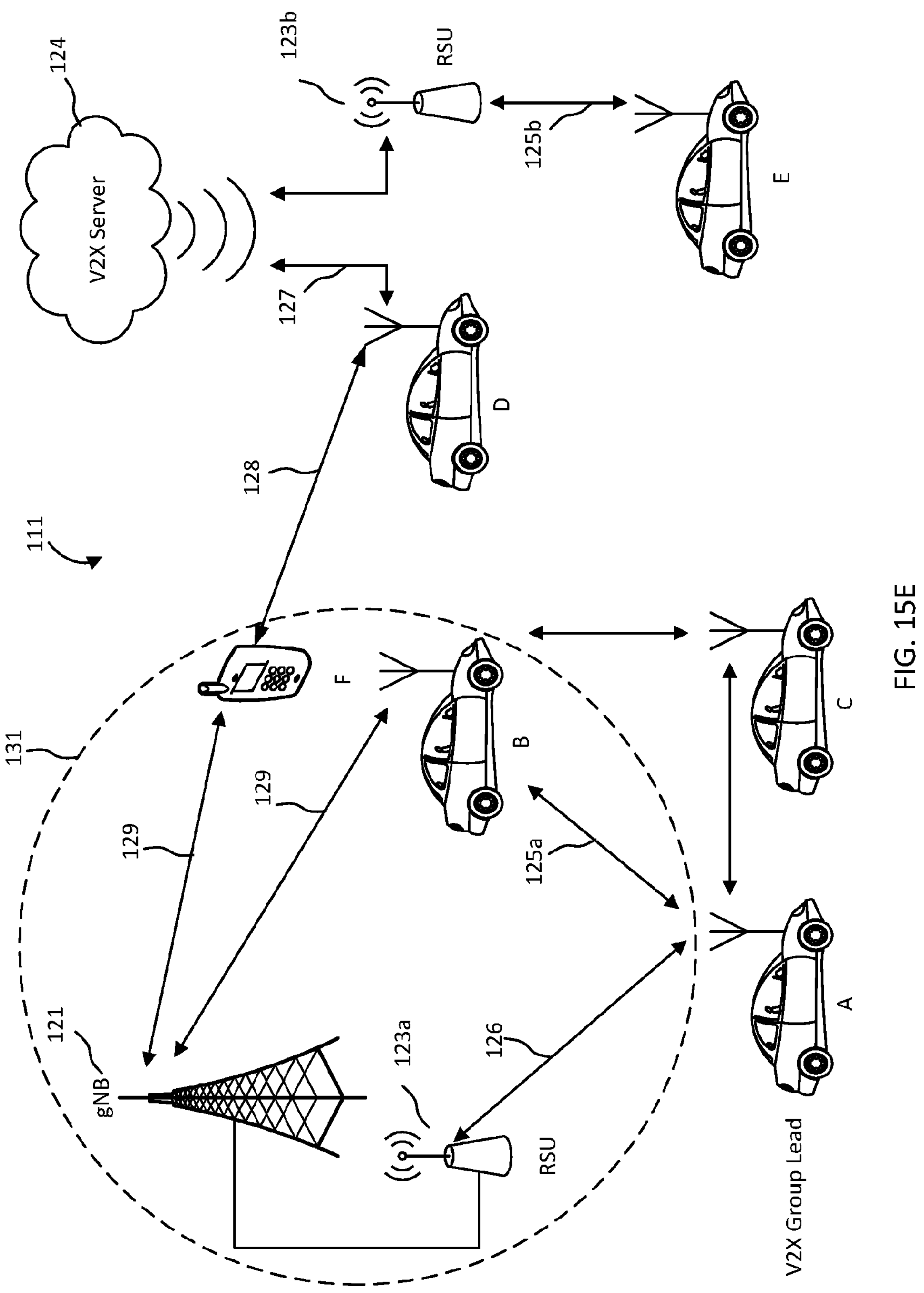
FIG. 15E show another example communications system.

FIG. 15E illustrates an example communications system 111 in which the systems, methods, apparatuses described herein may be used. Communications system 111 may include Wireless Transmit/Receive Units (WTRUs) A, B, C, D, E, F, a base station gNB 121, a V2X server 124, and Road Side Units (RSUs) 123*a* and 123*b*. In practice, the concepts presented herein may be applied to any number of WTRUs, base station gNBs, V2X networks, and/or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUs A, B, C, D, E, and F may communicate with each other over a Uu interface 129 via the gNB 121 if they are within the access network coverage 131. In the example of FIG. 15E, WTRUs B and F are shown within access network coverage 131. WTRUs A, B, C, D, E, and F may communicate with each other directly via a Sidelink interface (e.g., PC5 or NR PC5) such as interface 125*a*, 125*b*, or 128, whether they are under the access network coverage 131 or out of the access network coverage 131. For instance, in the example of FIG. 15E, WRTU D, which is outside of the access network coverage 131, communicates with WTRU F, which is inside the coverage 131.

WTRUS A, B, C, D, E, and F may communicate with RSU 123*a* or 123*b* via a Vehicle-to-Network (V2N) 133 or Sidelink interface 125*b*. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 15F:
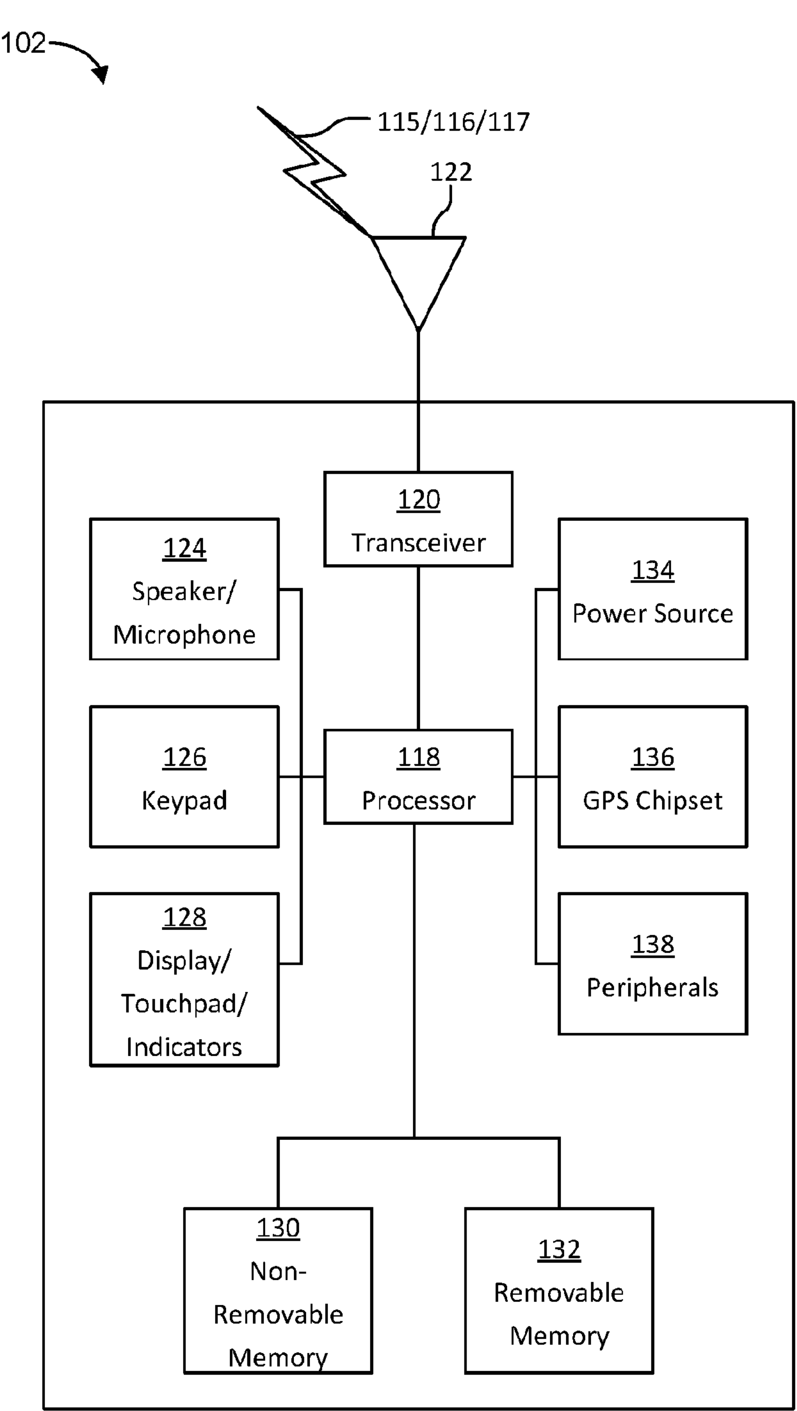
FIG. 15F shows a block diagram of an example apparatus or device, such as a WTRU.

FIG. 15F is a block diagram of an example apparatus or device WTRU 102 that may be configured for wireless communications and operations in accordance with the systems, methods, and apparatuses described herein, such as a WTRU 102 of FIG. 15A, 8B, 8C, 8D, or 8E. As shown in FIG. 15F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It may be appreciated that the WTRU 102 may include any sub-combination of the foregoing elements. Also, the base stations 114*a* and 114*b*, and/or the nodes that base stations 114*a* and 114*b* may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 15F and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 15F depicts the processor 118 and the transceiver 120 as separate components, it may be appreciated that the processor 118 and the transceiver 120 may be integrated together in an electronic package or chip.

The transmit/receive element 122 of a UE may be configured to transmit signals to, or receive signals from, a base station (e.g., the base station 114*a* of FIG. 15A) over the air interface 115/116/117 or another UE over the air interface 115*d*/116*d*/117*d*. For example, the transmit/receive element 122 may be an antenna configured to transmit and/or receive RF signals. The transmit/receive element 122 may be an emitter/detector configured to transmit and/or receive IR, UV, or visible light signals, for example. The transmit/receive element 122 may be configured to transmit and receive both RF and light signals. It may be appreciated that the transmit/receive element 122 may be configured to transmit and/or receive any combination of wireless or wired signals.

In addition, although the transmit/receive element 122 is depicted in FIG. 15F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit. The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114*a*, 114*b*) and/or determine its location based on the timing of the signals being received from two or more nearby base stations. It may be appreciated that the WTRU 102 may acquire location information by way of any suitable location-determination method.

The processor 118 may further be coupled to other peripherals 138, which may include one or more software and/or hardware modules that provide additional features, functionality, and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 15G:
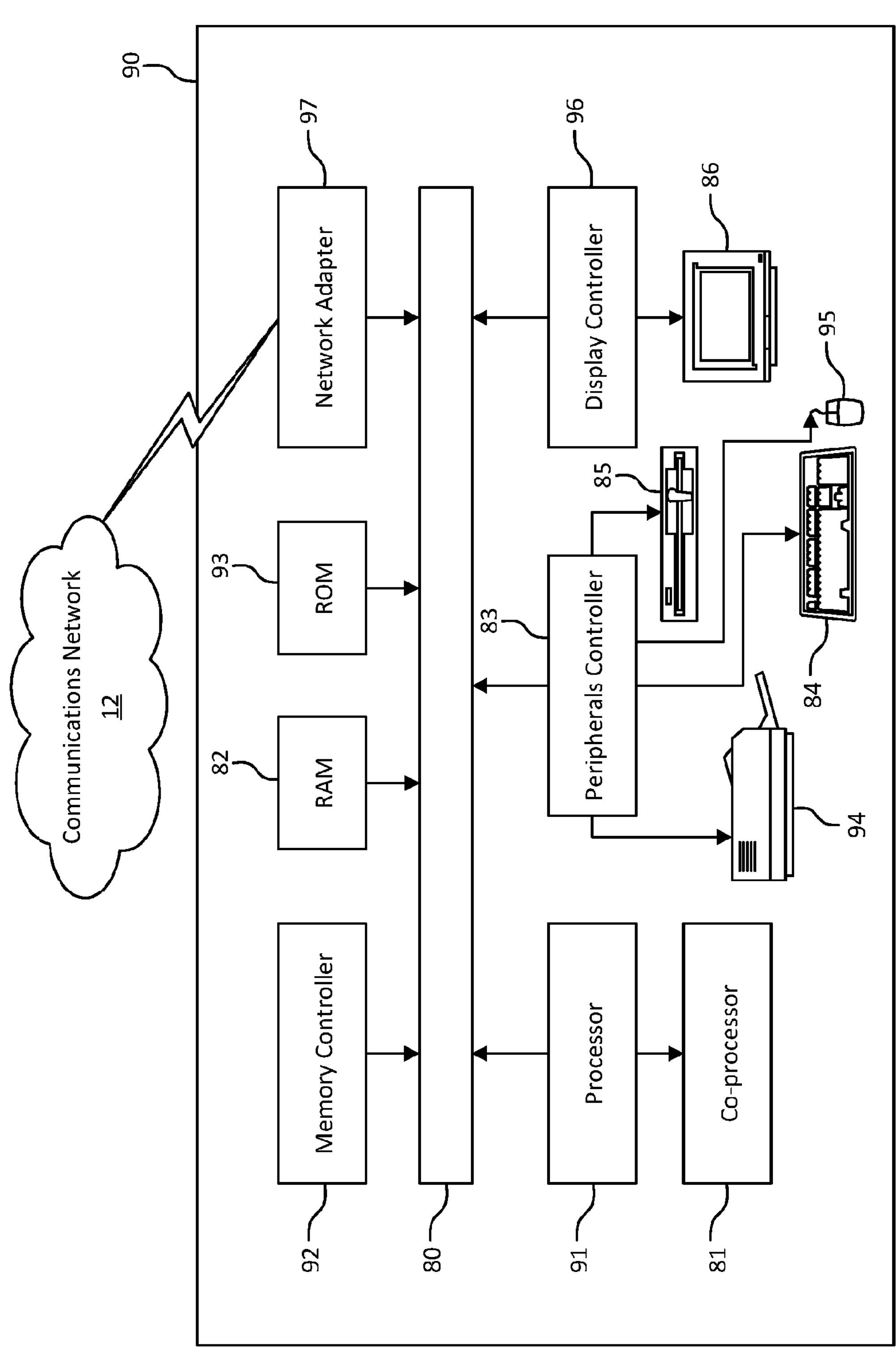
FIG. 15G shows a block diagram of an exemplary computing system.

FIG. 15G is a block diagram of an exemplary computing system 90 in which one or more apparatuses of the communications networks illustrated in FIGS. 8A, 8C, 8D and 8E may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that may not easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it may not access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIGS. 8A, 8B, 8C, 8D, and 8E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations, or functions described herein may be implemented in the form of such computer executable instructions, executing on the processor of an apparatus or computing system configured for wireless and/or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

What is claimed is:

1. A method performed by a wireless transmit/receive unit (WTRU), the method comprising:

sending a registration request message to a network, the registration request message comprising a capability field indicating that the WTRU is capable of receiving network slice temporal availability information;

receiving a message from the network, the message including temporal availability information for at least a first network slice and a second network slice in response to the capability field indicating that the WTRU is capable of receiving the network slice temporal availability information;

establishing a first protocol data unit (PDU) session associated with the first network slice for communicating data associated with an application;

determining that the first network slice is unavailable based on the temporal availability information for the first network slice;

halting the first PDU session associated with the first network slice based on the first network slice being unavailable according to the temporal availability information for the first network slice; and establishing a second PDU session associated with the second network slice, wherein the WTRU determines to attempt to use the second network slice for communicating the data associated with the application based on the temporal availability information for the second network slice indicating that the second network slice is available and the temporal availability information for the first network slice indicating that the first network slice is unavailable, wherein one or more user equipment route selection policy (URSP) rules are evaluated to select the second network slice.

2. The method of claim 1, further comprising notifying the application that the first network slice has become unavailable.

3. The method of claim 1, further comprising notifying the application that the first network slice is becoming unavailable prior to a time when the temporal availability information for the first network slice indicates that the first network slice will become unavailable.

4. The method of claim 1, wherein the temporal availability information for the first network slice indicates that the first network slice will be unavailable for a first time period, and the temporal availability information for the second network slice indicates that the second network slice will be unavailable for a second time period.

5. The method of claim 1, wherein the message is a registration response message received in response to the registration request message.

6. The method of claim 1, wherein the message is a configuration update message.

7. The method of claim 1, further comprising, on a condition that the first network slice is available, sending the data associated with the application to the network using the first PDU session.

8. The method of claim 1, further comprising receiving updated temporal availability information for at least one of the first network slice or the second network slice.

9. A wireless transmit/receive unit (WTRU) comprising a processor configured to:

send a registration request message to a network, the registration request message comprising a capability field indicating that the WTRU is capable of receiving network slice temporal availability information;

receive a message from the network, the message including temporal availability information for at least a first network slice and a second network slice in response to the capability field indicating that the WTRU is capable of receiving the network slice temporal availability information;

establish a first protocol data unit (PDU) session associated with the first network slice for communicating data associated with an application;

determine that the first network slice is unavailable based on the temporal availability information for the first network slice;

halt the first PDU session associated with the first network slice based on the first network slice being unavailable according to the temporal availability information for the first network slice; and establish a second PDU session associated with the second network slice, wherein the WTRU determines to attempt to use the second network slice for communicating the data associated with the application based on the temporal availability information for the second network slice indicating that the second network slice is available and the temporal availability information for the first network slice indicating that the first network slice is unavailable, wherein the WTRU is configured to evaluate one or more user equipment route selection policy (URSP) rules a to select the second network slice.

10. The WTRU of claim 9, wherein the processor is further configured to notify the application that the first network slice has become unavailable.

11. The WTRU of claim 9, wherein the processor is further configured to notify the application that the first network slice is becoming unavailable prior to a time when the temporal availability information for the first network slice indicates that the first network slice will become unavailable.

12. The WTRU of claim 9, wherein the temporal availability information for the first network slice indicates that the first network slice will be unavailable for a first time period, and the temporal availability information for the second network slice indicates that the second network slice will be unavailable for a second time period.

13. The WTRU of claim 9, wherein the message is a registration response message received in response to the registration request message.

14. The WTRU of claim 9, wherein the message is a configuration update message.

15. The WTRU of claim 9, wherein the processor is further configured to, on a condition that the first network slice is available, send the data associated with the application to the network using the first PDU session.

16. The WTRU of claim 9, wherein the processor is further configured to receive updated temporal availability information for at least one of the first network slice or the second network slice.

* * * * *